United States Patent [19]

Takahashi et al.

[11] Patent Number: 5,073,888
[45] Date of Patent: Dec. 17, 1991

[54] OPTICAL PICKUP DEVICE

[75] Inventors: Yoshitaka Takahashi, Yokohama; Hiroshi Koide, Machida; Hiroshi Gotoh, Kawasaki; Masami Emoto; Syuichi Honda, both of Yokohama, all of Japan

[73] Assignee: Ricoh Company, Ltd., Tokyo, Japan

[21] Appl. No.: 340,044

[22] Filed: Apr. 18, 1989

[30] Foreign Application Priority Data

| Apr. 21, 1988 | [JP] | Japan | 63-99062 |
| Jul. 20, 1988 | [JP] | Japan | 63-180722 |
| Aug. 5, 1988 | [JP] | Japan | 63-195756 |
| Aug. 5, 1988 | [JP] | Japan | 63-195757 |

[51] Int. Cl.$^5$ .............................................. G11B 7/00
[52] U.S. Cl. ........................................ 369/112; 369/13; 369/110; 369/116; 360/59; 360/114
[58] Field of Search ............... 369/44.11, 44.14, 44.34, 369/44.38, 44.39, 13, 47, 116, 121, 122, 54; 360/59, 114

[56] References Cited

U.S. PATENT DOCUMENTS

| 4,085,423 | 4/1978 | Tsunoda et al. | 369/122 |
| 4,160,269 | 7/1979 | Kramer et al. | 369/109 |
| 4,167,024 | 9/1979 | Hamisch | 369/110 |
| 4,462,095 | 7/1984 | Chen | 369/44.38 |
| 4,517,667 | 5/1985 | Sprague | 369/109 |
| 4,532,522 | 7/1985 | Tsunoda et al. | 369/46 |
| 4,539,662 | 9/1985 | Hatano et al. | 369/13 |
| 4,546,463 | 10/1985 | Opheij et al. | 369/110 |
| 4,922,454 | 5/1990 | Taki | 360/59 |
| 4,951,274 | 8/1990 | Iwanaga et al. | 369/44.11 |

FOREIGN PATENT DOCUMENTS 59-207035 11/1984 Japan ............... 369/44.11

Primary Examiner—Roy N. Envall, Jr.
Assistant Examiner—Thai Tran
Attorney, Agent, or Firm—Cooper & Dunham

[57] ABSTRACT

An optical pickup device for recording, reproducing or erasing an information, comprises a sole semiconductor laser beam source for emitting a luminous flux, a polarizer for receiving the luminous flux emitted from the sole semiconductor laser beam source and dividing the received luminous flux into a plurality of luminous fluxes, and a sole object lens for receiving a plurality of the divided luminous fluxes and converging each of a plurality of the received luminous fluxes on small spots on an optical information recording medium, respectively.

7 Claims, 12 Drawing Sheets

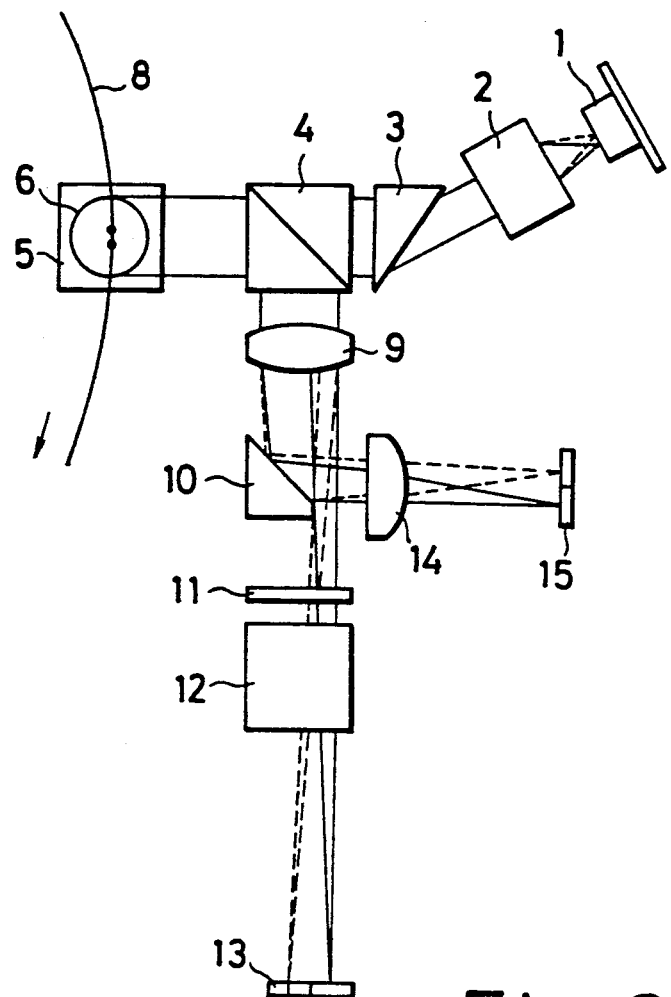
Fig. 2A
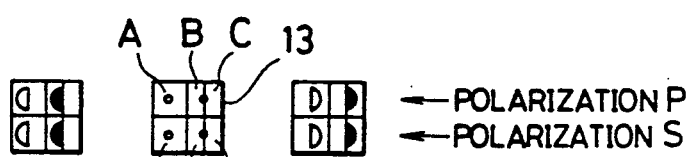
Fig. 2B
Fig. 2C

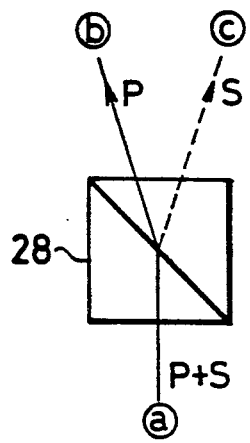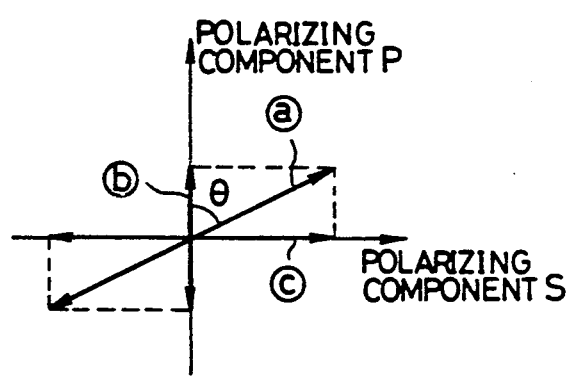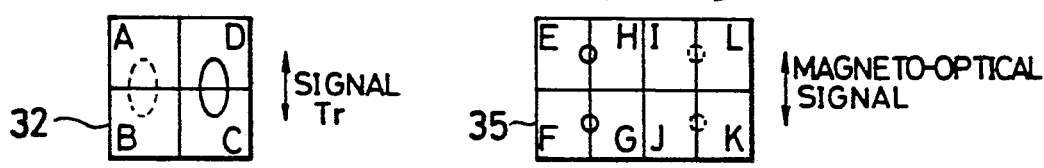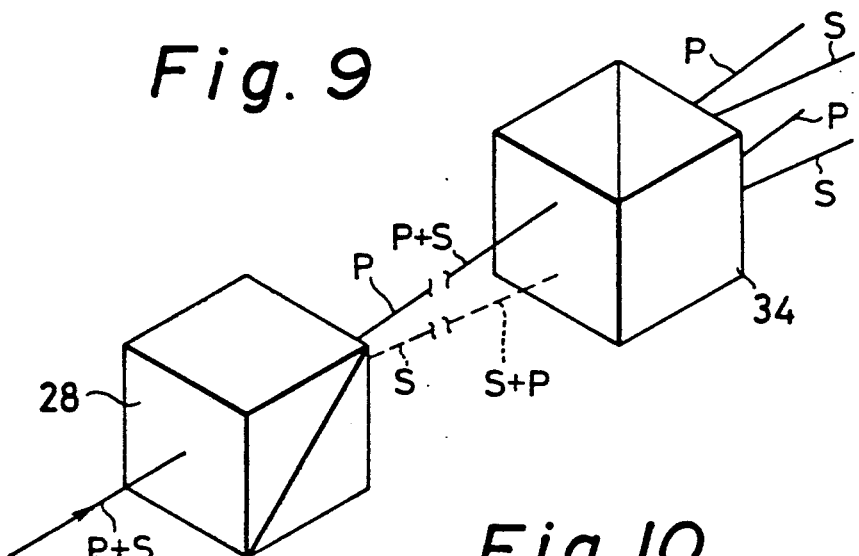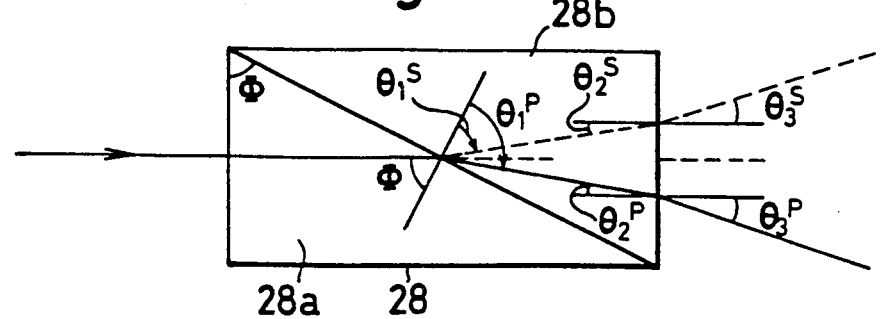

OPTICAL PICKUP DEVICE

BACKGROUND OF THE INVENTION

The present invention relates to an optical record-reproduction device, and, more particularly to an optical pickup device which can be suitably used in an magneto-optical disc device capable of recording/ reproducing/erasing.

Optical discs capable of recording/reproducing of information or recording/reproducing/erasing of information by the converging of a beam from a semiconductor laser on small spots through an object lens have recently attracted great attention. The reason for this lies in the fact that optical discs possess a large capacity and are inexpensive in terms of cost per bit. In addition, since these discs are designed to be removed, handling is easy for users.

However, optical discs suffer from the disadvantage that access time is too long compared with conventional hard discs such as magnetic discs. When recording is performed with an optical disc, an address is first accessed so that a spot may be positioned at a desired address in response to the recording command. The recording is then performed, and validation and reproduction of written information may be carried out after the recording has been completed. Since the recording mode of the optical discs thus comprises two modes, that is, the recording mode and the validation and reproduction mode, a considerably long time is taken to complete recording.

In order to overcome the above-described disadvantage, a multibeam optical pickup device has been proposed which is arranged in such a manner that a plurality of beams are successively converged on the same track so that a preceding beam is used for recording information and an ensuing beam is used for validating and reproduction (RAW). The system of the type described above offers the advantage that recording and reproduction can be simultaneously performed during one rotation, whereby the time taken to complete the recording mode can be shortened.

The system was, for example, reported in "Trial Manufacturing of 3.5-inch small magneto-optical disc device" one of the theses presented in prior to the Spring National Meeting of the Electronic Information Communication Society held in 1988.

However, a conventional multibeam optical pickup device of this type arranged in such a manner that a semiconductor array or a plurality of semiconductor lasers are used as the light source and an image is formed on a disc through the same object lens so as to obtain a plurality of spots involves certain disadvantages in that the relative positional relationship between spots on the disc is determined by the characteristics of the employed semiconductor laser (intervals of the chips and wave length) and that such a semiconductor laser which includes a plurality of the light emitting points is very expensive.

Systems for multibeam optical magnetic pickups are conventionally classified as follows: systems comprising a plurality of light sources in which individual light sources are used; and LD array systems in which a semiconductor laser array including a plurality of light sources is used.

With a multibeam magneto-optical pickup, beams from a plurality of light sources are individually converged through the same object lens on the same track of the magneto-optical recording medium. However, in order to simultaneously focus a plurality of beams on the magneto-optical recording medium, it is necessary to perfect a greatly improved degree of positional accuracy for each of the light sources. Therefore, positioning and mounting of the light source becomes extremely difficult.

On the other hand, in the LD array system, a problem arises in that a minimum distance between the spots of the corresponding beams that are converged on the track must be determined by the LD array. The reason for this lies in the fact that any reduction in distance between the light sources is to a certain degree limited because it is necessary to prevent relative affection caused by the change in the temperature of chips. In addition, in order to prevent creation of unequal distances between the spots, the distance between the chips of the LD array needs to be measured. As a result, the number of manufacturing processes required to assemble an magneto-optical pickup is increased and it is therefore difficult to reduce the cost of production thereof.

On the other hand, as is known, the oscillating wave length of a semiconductor laser may change due to variations in temperature. In an magneto-optical pickup in which an LD array is used as the light source, each semiconductor laser has an individual light source and thus does not emit light with the same output power. Each of the light sources thus has its own individual oscillating wave length. As a result, the converging position of each of the light beams from the object lens will inevitably be shifted in the direction of the optical axis due to the chromatic aberration of the optical system. Even if a dual wave length HLD array is used as the light source, the wave length of each of the light sources is originally different from the others, which also leads to the above-described problem due to the chromatic aberration generated. It might be considered feasible to employ an achromatic lens in the optical system. However, this involves the drawback that the overall cost of the optical pickup would be excessive because achromatic lenses are expensive.

SUMMARY OF THE INVENTION

To this end, an object of the present invention is to provide an optical pickup device of a multibeam optical pickup system which includes a semiconductor laser light source having a sole light emitting point, is capable of simultaneously recording/reproducing/erasing information during a rotation of a medium, can be produced at a reduced cost, has the capability to be readily mounted, and enables a shortened access time.

The object of the invention can be achieved by a first optical pickup device for recording, reproducing or erasing an information, comprising;

a sole semiconductor laser beam source for emitting a luminous flux, a beam dividing element for receiving said luminous flux emitted from said sole semiconductor laser beam source and dividing said received luminous flux into a plurality of luminous fluxes, and a sole object lens for receiving a plurality of said divided luminous fluxes and converging each of a plurality of said received luminous fluxes on small spots on an optical information recording medium, respectively.

A first device according to the present invention is structured in such a manner that a sole semiconductor laser beam source having only one light emitting point is used and laser beam emitted therefrom is arranged to be divided by a beam dividing element into a plurality of luminous flux in front of the object lens Therefore, a plurality of small spots applied to the same track of the optical information recording medium can be protected against affection such as wave length change or the like caused from the fact that the same light source is used. In addition, the interval between two spots and light intensity can be optionally determined simply by arranging the structure of the beam dividing elements, for example, by arranging or changing the vertical angle or the angle of the incidental plane of polarization of a double refractive polarizer such as an Wollaston prism. Therefore, a low cost multibeam type optical pickup device can be realized which can suspend the severe limitations experienced with the conventional multibeam emitting semiconductor laser system. In addition, by providing a magnetic head whose magnetic field can be modulated in response to a recording signal for the magneto-optical disc, an over-write type device in which recording/erasing can be simultaneously performed can be realized, and this device can perform a RAW function in which information is validated and reproduced immediately after information has been recorded. As a result, time required for processing information in the recording mode can be reduced. Furthermore, by changing the light intensity of a plurality of the small spots, a satisfactory improved reproduction action can be performed without any modulation of the semiconductor laser light source. In addition, by using a double refractive polarizer such as an Wollaston prism as the beam dividing element, the light intensity and the interval between spots can be readily changed simply by changing the structure of the optical element.

The object of the invention can be achieved by a second optical pickup device for recording, reproducing or erasing an information, comprising;

a sole semiconductor laser beam source for emitting a luminous flux, a beam dividing element for receiving said luminous flux emitted from said sole semiconductor laser beam source and dividing said received luminous flux into two luminous fluxes which are different in intensity from each other, and a sole object lens for receiving said two luminous fluxes and converging each of said two luminous fluxes on small spots on a magneto-optical recording medium, respectively, one of said two luminous fluxes having a stronger intensity being used in recording an information and the other of said two luminous fluxes having a weaker intensity being adopted to be used in validating and reproducing said recorded information, in a recording mode, said one of said two bundles of rays having said stronger intensity being used in reproducing said recorded information, and said semiconductor laser beam source being adapted to reduce an output thereof so as to protect a coercive force of said magneto-optical recording medium against an affection of said luminous flux other than said one of said two luminous fluxes having said stronger intensity to be used in reproducing, in a reproducing mode.

A second device according to the present invention can realize a multibeam system by obtaining two luminous fluxes from a semiconductor laser having a sole light source. Therefore, it can, in principle, overcome the problems experienced with the conventional multibeam system that is a difficulty of adjusting the positions of a plurality of light sources, another difficulty of reducing the cost of the light source, and a problem in terms of chromatic aberration due to the presence of a plurality of light sources.

Furthermore, the intensity ratio between spots can be optionally adjusted, and the distance between the spots can be readily determined. It is preferable for the size of the magnetic head to be reduced in order to perform a high speed modulation. Practically, an air floating type magnetic head is preferable to be employed.

In addition, three luminous fluxes can be obtained from the semiconductor laser having a sole light source as to have, in the recording mode, the luminous flux with the strongest intensity used for erasing, the luminous flux with the intermediate level intensity used for recording, and the luminous flux with the weakest intensity used for validating and reproducing. In the reproducing mode, the reproducing can be performed in such a manner that the luminous flux with the strongest intensity is used and the coercive force can be protected from the affection of the luminous flux with the intermediate intensity and the weakest intensity by weakening the intensity of the light source.

The object of the invention can be achieved by a third optical pick up device for recording an information, comprising;

a sole semiconductor laser beam source for emitting a bundle of rays, a beam dividing element for receiving said luminous flux emitted from said sole semiconductor laser beam source and dividing said received luminous flux into two luminous fluxes, and a sole object lens for receiving said two luminous fluxes and converging each of said two luminous fluxes on two of small spots on the same track of a magneto-optical recording medium, respectively, a preceding one of said two of small spots being used for recording an information and an ensuring one of said two of small spots being used for validating and reproducing said recorded information, in a recording mode, wherein a reflected light from said magneto-optical recording medium having a stronger intensity of said two of small spots is used for detecting a focusing error signal.

A third device according to the present invention is arranged in such a manner that a plurality of spots obtained on the optical magnetic disc are formed by dividing a beam emitted from a semiconductor laser having a sole light source. Therefore, the position of convergence of these spots on the magneto-optical disc in the direction of the optical axis can coincide with each other. As a result, the focusing error signal may be detected by any of a plurality of beams to be reflected from the magneto-optical disc. A focusing error signal can be detected with the significantly reduced error by using the beam with the strongest intensity. Therefore, accurate focus control of a plurality of beams can be performed.

The object of the invention can be achieved by a fourth optical pickup device for recording, reproducing or erasing an information, comprising;

an emitting means for emitting a plurality of luminous fluxes with a predetermined angle formed therebetween, a sole object lens for receiving a plurality of said emitted luminous fluxes and converging each of a plurality of said received luminous fluxes on small spots on an optical information recording medium, respectively, a light receiving element for receiving a plurality of reflected light from said optical information recording medium through said sole object lens, and a division-angle enlarging member disposed on a light passage between said sole object lens and said light receiving element for enlarging respective angles of a plurality of said reflected luminous fluxes.

A fourth device according to the present invention is characterized in that an optical component is provided in a light passage between the object lens and a light receiving element of the light receipt detection system, this optical component having a division-angle enlarging portion adapted to emit reflected beams which pass therethrough with the angle between the reflected beams enlarged. Therefore, even if the interval between a plurality of spots to be converged and applied to the optical information recording medium is too narrow, the angle formed between the beams can be enlarged by the division-angle enlarging portion of the optical component during a passage from the position at which the same is emitted to the light receiving element of the light receipt detection system via the object lens again. Therefore, the interval between the spots on the light receiving element can be widened, a facility of mounting the light receiving element can be improved, and the detection accuracy is as well improved.

Further objects and advantages of the present invention will be apparent from the following description, reference being had to the accompanying drawings wherein preferred embodiments of the present invention are clearly shown.

BRIEF DESCRIPTION OF THE DRAWINGS

FIGS. 2A-2C are views which illustrate a signal detection operation performed by the device shown in FIG. 1;

FIGS. 6A and 6B are views which illustrate a beam division operation performed by an Wollaston prism;

FIG. 7 is a plan view which illustrates a light receiving element viewed in the direction designated by an arrow A of FIG. 5;

FIG. 8 is a plan view which illustrates a light receiving element viewed in the direction designated by an arrow B of FIG. 5;

FIG. 9 is a schematic perspective view which illustrates the relationship between the directions in which the beams from the corresponding two Wollaston prisms are divided;

FIG. 10 is a front view which illustrates the Wollaston prism;

DESCRIPTION OF THE PREFERRED EMBODIMENTS

Figure 1:
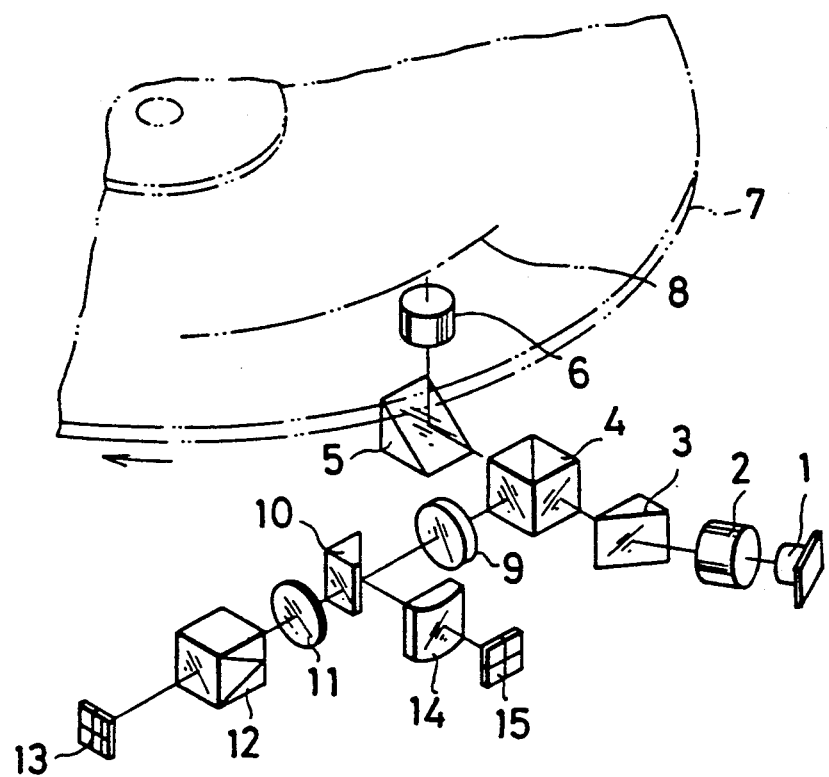
FIG. 1 is a schematic perspective view which illustrate a conventional optical pickup device of a multibeam system.

A conventional multibeam optical pickup device will be described with reference to FIGS. 1 to 2. Two laser beams emitted from an array-shaped semiconductor laser (or a dual wave length hybrid laser array) 1 are successively converged on two adjacent spots on the same track of an optical disc 7 via a common optical system, that is, a coupling lens 2, a beam shaping prism 3, a beam splitter 4, a polarizing prism 5, and an object lens 6. A reflected luminous flux from the optical disc 7 is separated from the incident luminous flux by the beam splitter 4 after it has again passed through the lens 6 and the prism 5. Then, the thus-separated reflected luminous flux is introduced into a detection optical system.

The luminous flux to be directed to the detection optical system is divided into a rectilinear propagation luminous flux and a reflected luminous flux by a knife-edge prism 10 after it has passed through a converging lens 9. The rectilinear propagation bundle of rays is converged on two spots by the lens 9 with their polarization plane turned by substantially 45° by a λ/2-plate 11 disposed at an intermediate position of the passage for the rectilinear propagation rays. Each of the thus-turned rectilinear propagation luminous flux is divided into a component P and a component S by a Wollaston prism 12 so that four spots are totally formed on a light receiving element 13 which is divided into six regions. On the other hand, the reflected rays from the prism 10 generate astigmatisms by a cylindrical lens 14 disposed at an intermediate position in the passage for the reflected flux so that two oblong spots are formed on a light receiving element 15 which is divided into four regions.

An operation of the thus-structured optical pickup device will be described with reference to FIG. 2.

As shown in focused state of FIG. 2B, a first beam of the rectilinear propagation luminous flux is converged on a boundary line between B and C of the light receiving element 13 which is divided into six regions and thus has six light receiving portions A to F and the boundary line between D and E of the same. If there is a focusing shift in this state, the formed spot becomes out of focus as shown in forward out of focus and rearward out of focus states of FIGS. 2B, causing amount of received bundle of rays to become different between B and C or between D and E. That is, the plus symbols or the minus symbols of the detection signal for the light receiving element 13 can be reversed by way of calculating $(B-C)$, $(D-E)$, or $(B+E)-(C+D)$ if the lens 6 is positioned too closer or too far away from the disc 7. Therefore, the detection signal can be subjected to focus servo by making any of the abovedescribed differences zero, this method being the same as the conventional knife edge method. In this state, if the distance between the spot of the first beam and the same of the second beam is sufficiently larger than the size of the light receiving element, this second beam cannot adversely affect the focus detection and control.

On the other hand, since the difference $(B+C)-(D+E)$ of the detection signal of the light receiving element 13 of the above-described rectilinear propagation bundle of rays is the difference between the polarizing components P and S of the first beam, a magneto-optical signal can be detected by calculating this difference. Similarly, a magneto-optical signal of the second beam can be detected by calculating $(A-F)$.

As for the reflected flux from the prism 10, by disposing, as shown in FIG. 2C, a light receiving element 15 having four light receiving portions G to J in such a manner that the apse lines of the oblong spots become perpendicular to the direction of the track, the light receiving portions H and I receive the first beam, while G and J receive the second beam as shown in track focus state of FIG. 2C. If there is a tracking shift, a light quantity difference is, as shown in FIG. 2C, generated on the basis of the direction of the tracking shift. That is, a tracking error signal of the first beam can be detected by $(H-I)$, while a tracking error signal can be detected by $(G-J)$, this method being similar to the conventional push-pull method.

However, in the conventional multibeam optical pickup device that is arranged in such a manner that a semiconductor laser array or a plurality of semiconductor lasers are used as the light source thereof and imaging on the disc is performed through the same object lens to obtain a plurality of spots, all of the positional relationship between the spots on the disc is determined by the characteristics (the intervals of the chips, wave length and so on) of the semiconductor laser. Furthermore, such a semiconductor laser including a plurality of light emitting points is very expensive.

The above factors will be further in detail described.

(1) In the case where a semiconductor laser array is employed in the multibeam optical pickup device, the interval of the spots on the disc is determined on the basis of the interval between the light emitting points.

Figure 3:
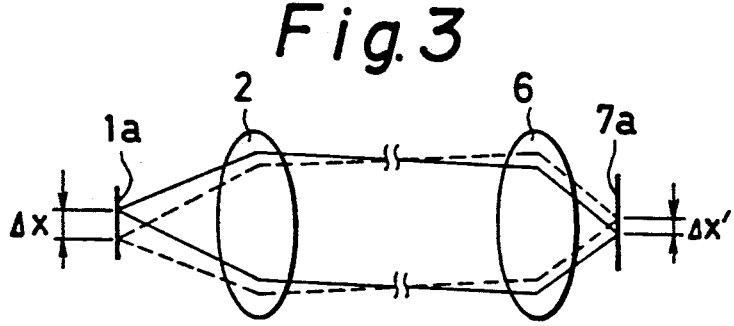
FIGS. 3 and 4 are perspective views which illustrate disadvantages of the device shown in FIG. 1.

This factor will be described with reference to FIG. 3 in which the optical system of such device is simply and schematically illustrated. Assuming that the interval between two light emitting points at an end surface $1a$ of the chip of the semiconductor laser 1 is $\Delta x$, the interval between two spots on a light converging plane $7a$ on the disc 7 is $\Delta x'$, the focal length of the object lens 6 is $f_{OL}$, and the focal length of the coupling lens 2 is $f_{CL}$, the following equation holds.

$$\Delta x' = (f_{OL}/f_{CL}) \cdot \Delta x \ldots \quad (1)$$

For example, assuming that $f_{OL}=4$ mm, and $f_{CL}=8$ mm, $\Delta x' = \Delta x/2$. That is, the interval $\Delta x'$ between spots on the disc 7 becomes, in this state, the half of the interval $\Delta x$ of the light emitting points of the laser 1. For example, assuming that $\Delta x = 100$ μm, the intervals $\Delta x'$ between the spots becomes $\Delta x' = 50$ μm. In this state, reduction in the interval $\Delta x$ of the light emitting points involves to have a certain limitation because rise in the temperature of the chips of the semiconductor laser relatively affects each other, causing change in the wave length of the emitted light and in the output. Therefore, a minimum length between the interval $\Delta x'$ of the spots which can be formed on the disc 7 is defined by the characteristics (the interval $\Delta x$ of the light emitting points) of the semiconductor laser 1.

Furthermore, in order to prevent creation of unequal distances between the intervals $\Delta x$ of the spots on the disc 7, the distance between the semiconductor laser chips needs to be measured. As a result, the cost of such a device becomes too expensive.

(2) In the case of a semiconductor laser array, each focused points of the two spots on the disc inevitably vary due to the positions of the light emitting points of the semiconductor laser array.

Figure 4:
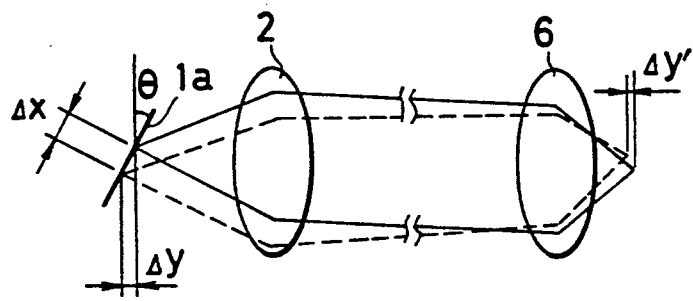

This factor will be described with reference to FIG. 4 in which the optical system of such a device is simply and schematically illustrated. It is assumed that the laser 1 is disposed at a position inclined by $\theta$ from a normal position that is the position where the chip end surface $1a$ of the laser 1 is perpendicular to the optical axis of the coupling lens 2 and the object lens 6. Provided that the interval between the light emitting points of the chip is $\Delta x$, the interval $\Delta y$ of the light emitting points of the chip can be expressed as follows as an value obtained by converting the value in the direction of the optical axis and assuming that $\theta \ll 1$:

$$\Delta y = \Delta x \cdot \sin \theta \approx \Delta x \cdot \theta \ldots \quad (2)$$

In this state, a shift $\Delta y'$ of the focused position on the disc 7 in the direction of the optical axis becomes as follows:

$$\Delta y' = (f_{OL}/f_{CL})^2 \cdot \Delta y \quad (3)$$
$$\approx (f_{OL}/f_{CL})^2 \cdot \Delta x \cdot \theta$$

For example, assuming that, similarly to the abovedescribed case, $f_{OL}=4$ mm and $f_{CL}=8$ mm, $\Delta y'=\Delta x \cdot \theta/4$. In order to reduce the shift of the focused points of the two spots below 0.25 μm, that is, in order to realize a fact that $\Delta y'<=0.25$, it needs that $\Delta x \cdot \theta \leq 1$ μm holds. Provided that $\Delta x=100$ μm, it needs for an inclined angle $\theta$ to be 34' or less. Therefore, an angle $\theta$ at which the semiconductor 1 is mounted needs to reveal a considerably improved accuracy. If the above-described angle $\theta$ becomes greater, the interval between the spots described in (1) can be necessarily varied.

(3) In the case of a semiconductor laser including hybrid laser array having individual light emitting points, the positions at which the two spots are focused on the disc become different due to the positions of the light emitting points.

Assuming that the interval of the light emitting points of the hybrid laser array in the optical axis is $\Delta y$ and a shift of the points at which the spots are focused on the disc is $\Delta y'$, the following equation, similarly to the case of (2) described with reference to FIG. 4, holds:

$$\Delta y'=(f_{OL}/f_{CL})^2 \cdot \Delta y \ldots \quad (4)$$

Assuming, for example, that $f_{OL}=4$ mm and $f_{CL}=8$ mm, $\Delta y'=\Delta y/4$. That is, a shift $\Delta y'$ between the focused points of the two spots becomes a quarter of a shift $\Delta y$ of the light emitting points in the optical axis. Assuming that an allowable shift of the focused position on the disc is $\Delta y'\leq =0.25$ μm in this state, it needs for a shift of the light emitting points of the hybrid laser array in the direction of the optical axis to be made $\Delta y \leq 1$ μm.

Therefore, in order to restrict the created unequal focused positions of the two spots on the disc below an allowable level, it needs for the unequal distance between the semiconductor laser chips in the optical direction to be prevented as much as possible. Consequently, the cost of the device becomes too large. Furthermore, as in the case of (2), the positions of the light emitting points in the direction of the optical axis can be shifted due to the manner of mounting the semiconductor laser. Therefore, an accurate mounting and adjusting work needs to be performed. (4) The refractive index of a lens can be changed due to change in the wave length of a semiconductor laser.

Assuming that the light velocity is c, and the frequency is $\underline{\nu}$ (constant), the following relationship between wave length $\lambda$ and refractive index n holds:

$$n=c/\lambda \nu \ldots \quad (5)$$

This means a fact that the more the wave length becomes, the refractive index becomes smaller.

On the other hand, semiconductor lasers reveal a general characteristic that the wave length thereof becomes larger (for example, several nms/10 mW) in proportion to increase in the power to be applied thereto. In a subject semiconductor laser including a plurality of light emitting points, since these two light emitting points do not emit light with the same output power, each light emitting point emits light having an individual wave length, and the refractive index corresponding to the individual wave lengths becomes different. As a result, the focused positions of the two spots on the disc can be shifted, the direction of this shift being in the two directions described in (1) and (2).

In particular, in the case of the dual wave length hybrid laser array, since the two wave lengths are different from each other as 780 nm and 830 nm, this tendency can become apparent excessively.

It might therefore be considered feasible to employ an achromatic lens for the purpose of cancelling the abovedescribed change in wave length. However, the achromatic effect cannot be realized by a single lens of aspherical surface type. Therefore, the size of the optical pickup can become too large and the cost of the same becomes too expensive.

An embodiment of the first device according to present invention will now be described with reference to FIGS. 5 to 11.

The schematic structure and operation of an optical pickup used for the magneto-optical disc according to the embodiment of the first device will be described with reference to FIG. 5.

A sole semiconductor laser light source 21 including a sole light emitting point is provided as illustrated. Laser beams emitted from this semiconductor laser 21 are made a parallel bundle of rays by a coupling lens 22, and are beam-shaped by a beam shaping prism 23. Then, the beam-shaped luminous flux passes through a beam splitter 24, and is thus converged and applied as to form a small spot on an optical magnetic disc 26 serving as an optical information recording medium after it has passed through an object lens 25. A magnetic head 27 is disposed adjacent to the rear side of this optical magnetic disc 26.

According to this embodiment, an optical dividing element is provided in the optical path between the laser 21 and the lens 25 so that the bundle of rays is divided into a plurality of luminous fluxes, it being divided into two luminous fluxes in this embodiment. Then, the thus-divided luminous fluxes are, via the object lens 25, applied to the same track on the disc 26. Such an optical dividing element can comprise a polarizer using a double refractive crystal such as a Wollaston prism or a Rochon prism. In this embodiment, a Wollaston prism 28 is employed. The optical dividing element can, of course, comprise a diffraction grating in which a grating such as a hologram is employed. Any of the above-described types of the optical dividing elements can divide light into double beams or triple beams on the basis the manner of manufacturing the elements. That is, each of the divided beams can be used for erasing, recording and reproducing.

Figure 5:
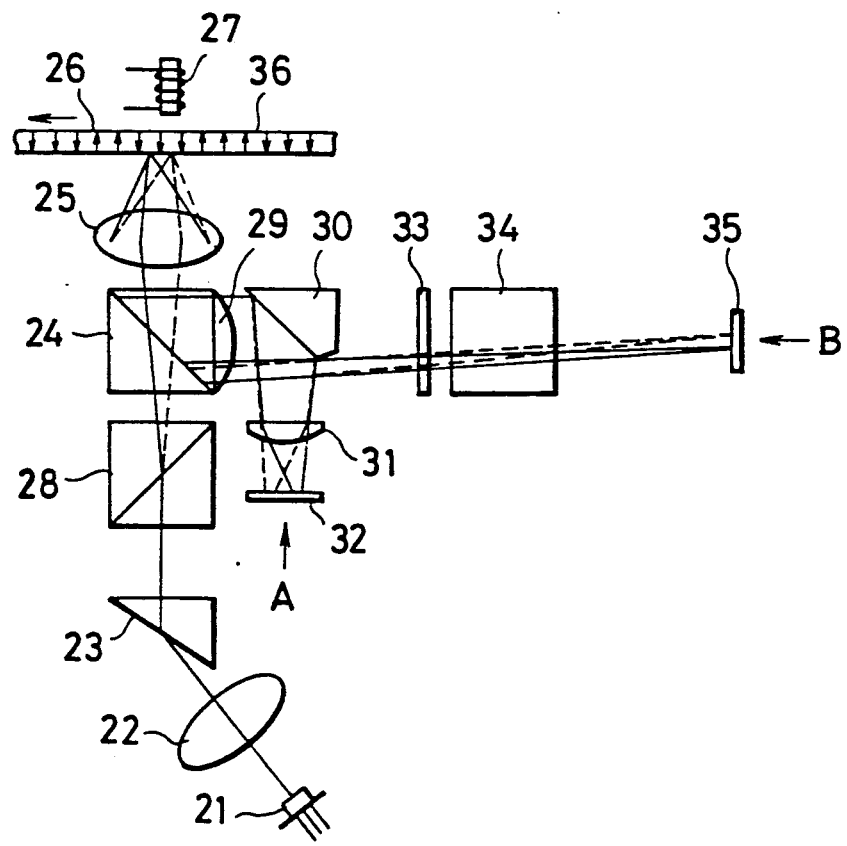
FIG. 5 is a view which illustrates an embodiment of the first device according to the present invention.
Figure 11A:
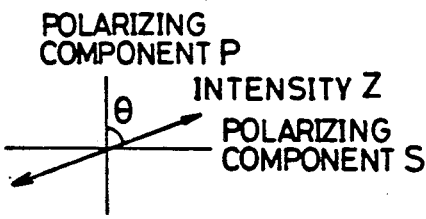
FIGS. 11A-11G are views which illustrate light deflection after the beam has passed through the optical components of the device shown in FIG. 1.
Figure 11B:
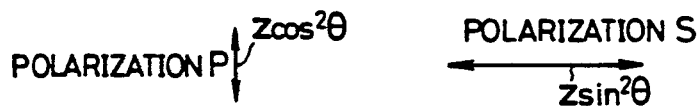
Figure 11C:
Figure 11D:
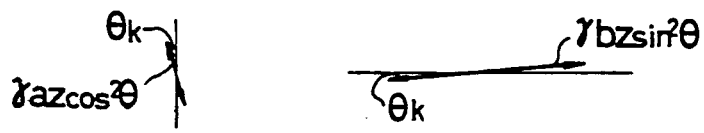
Figure 11E:
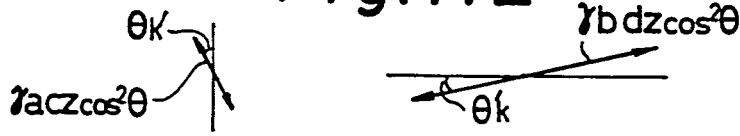
Figure 11F:
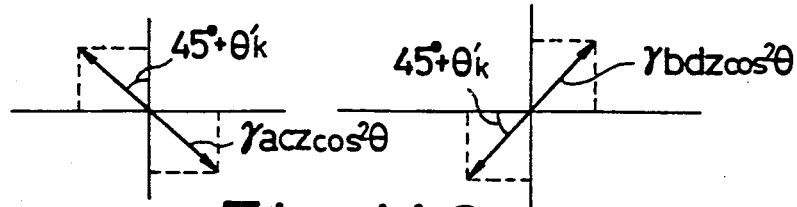
Figure 11G:
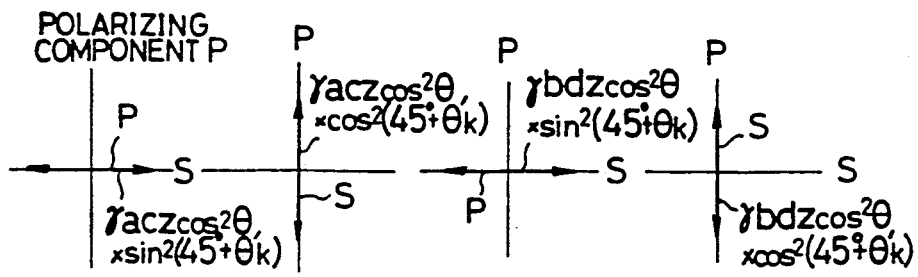

Referring to FIG. 5, the polarization plane of the laser 21 is inclined by $\theta$ when viewed perpendicularly to the sheet of the accompanying drawing. As shown in FIG. 6A, it leads to a fact that both polarizing components P and S which are as shown by ⓐ are made incident upon the prism 28, and the luminous flux is divided into a flux containing only a polarization component P as shown by a continuous line ⓑ and a flux containing only a polarization component S as shown by a dashed line ⓒ as a result of passing through the prism 28. The intensity ratio of these two components can be, as is shown in FIG. 6B, changed optionally in accordance with the angle of the plane of polarization of the semiconductor laser beam to be made incident upon the prism 28.

It is assumed that an incident angle of the plane of polarization of the laser beam to be made incident upon the prism 28 is $\theta$. Therefore, the intensity ratio between the polarizing components P and S after the laser beam has passed through the Wollaston prism 28 becomes:

$$P : S = \cos^2\theta : \sin^2\theta \ldots \quad (6)$$

Therefore, the two spots comprising the polarizing component P designated by (b) and the polarizing component P designated by (c) can be optionally changed by a manner of arranging the plane of polarization of the incident light a. For example, in a case where the intensity ratio is intended to be made P : S = 1:3, it needs to hold $\tan^2\theta = 3 \rightarrow \theta = \tan^{-1}\sqrt{3} = 60$ since $\sin^2\zeta = 3\cos^2\theta$. The plane of polarization may be alternatively turned in such a manner that the laser 21, the lens 22 and the prism 23 are rotated integrally. Alternatively, it may be turned in such a manner that an wave plate (a phase difference plate) is inserted into a front portion of the prism 28. According to any of the above-described methods, the loss of the flux can be significantly reduced, and all of the laser beams which have made incident upon the prism 28 can be used. Although a method of changing the light intensity of the two beams that is arranged in such a manner that the transmittance of the polarizing components P and S of the beam splitter 24 can be employed, it is not preferable to be employed in terms of the efficiency in utilization of light.

The laser beams which have been divided into two luminous fluxes after they had passed through the prism 28 pass through the beam splitter 24 and the lens 25 so that two small spots are formed on the disc 26. The thus-formed small spots are reflected by the disc 26. The thus-reflected two luminous fluxes again pass through the lens 25 light reflected by the disc 26 is separated from emitted light from the semiconductor laser by the beam splitter 24. Then, the separated beam is directed to a detection optical system.

The beams are made converged beams by a detection lens 29 attached on the emitting plane of the beam splitter 24, and are directed to the knife edge prism 30 wherein they are divided into rectilinear bundles of rays and reflected luminous fluxes. The reflected luminous fluxes are formed in an oblong spot shape by a cylindrical lens 31 and imaged on a light receiving element 32 adapted to detect tracking signals. Since the generating line for the cylindrical lens 31 is arranged to be perpendicular to the direction of the track, the thus imaged reflected luminous flux is made a tracking signal by a push-pull method with the intensity difference between the upper portion of the oblong spot and the lower portion of the same calculated as shown in FIG. 7. That is, as shown in FIG. 7, each tracking information of the two spots on the magneto-optical disc 26 can be obtained by using the light receiving element 32 which is divided into four light receiving portions A to D.

On the other hand, the plane of polarization of the rectilinear propagation bundle of rays from the prism 30 is turned by 45° by a λ/2-plate 33. Then, the thus-turned rectilinear propagation bundle of rays is divided into polarizing components P and S by a second Wollaston prism 34. This prism 34 is arranged in such a manner that the luminous fluxes divided by the same are directed perpendicular to the directions of the luminous fluxes divided by the prism 28 as schematically illustrated in FIG. 9. As a result, the two luminous fluxes (P+S) and (S+P) divided into two luminous fluxes (polarizing components P and S) by the prism 28 and reflected by the magneto-optical disc 26 are each divided, by the prism 34, into the polarizing components P and S. As a result, four luminous fluxes are emitted from the prism 34. In order to receive the thus-emitted luminous fluxes, a light receiving element 35 is provided. This light receiving element is adapted to detect the focusing and magneto-optical signals and structured as to include eight light receiving portions E to K as shown in FIG. 8. The focusing detecting signal can be detected by the knife edge method on the basis of the difference in the directions (the direction designated by an arrow representing a signal of shown in FIG. 8) in which the prism 30 crosses the luminous flux. On the other hand, the magneto-optical signal can be detected on the basis of the difference in the directions (the direction designated by an arrow representing the magneto-optical signal) perpendicular to the above-described directions, that is, on the basis of the different output.

Then, determination process of the interval between spots on the same track on the disc 26 on the basis of the characteristics of the prism 28 will be described with reference to FIG. 10.

The angle of the two luminous fluxes divided after passing through the prism 28 is determined by the vertical angle Φ of the two prisms 28a and 28b which form the prism 28. In the prism 28a, the polarizing component P becomes an abnormal ray, while the polarizing component S becomes a normal ray. On the other hand, in the prism 28b, the polarizing component P becomes a normal ray, while the polarizing component S becomes an abnormal ray. Then assuming that $n_O$ represents the refractive index of a normal ray, and $n_E$ represents the refractive index of a normal ray, the polarizing component P holds the following equation:

$$n_E \cdot \sin\Phi = n_O \cdot \sin\theta_1^P \ldots \quad (7)$$

$$nO \cdot \sin\theta_2^P = 1 \cdot \sin\theta_3^P \ldots \quad (8)$$

$$\Phi = \theta_1^P - \theta_2^P \ldots \quad (9)$$

On the other hand, the polarizing component the following equation:

$$n_O \cdot \sin\Phi = n_E \cdot \sin\theta_1^S \ldots \quad (10)$$

$$n_E \cdot \sin\theta_2^S = 1 \cdot \sin\theta_3^2 \ldots \quad (11)$$

$$\Phi = \theta_1^S - \theta_2^S \ldots \quad (12)$$

From these equations (7) to (12), $\theta_3^P$ and $\theta_3^S$ are determined by an angle Φ. Therefore, also the division angle $\psi = \theta_3^P$ is determined by angle $\psi$.

Assuming that $n_O = 1.539$ and $n_E = 1.548$, the separation angle $\psi$ when an vertical angle Φ is varied successively becomes as follows:

| Vertical angle Φ | Separation angle Ψ |
|---|---|
| 10° | 0.182° |
| 20° | 0.375° |
| 30° | 0.595° |
| 40° | 0.865° |
| 50° | 1.229° |

On the other hand, assuming that the focal length of the lens 25 is $f_{OL}$, the interval l between the spots on the disc 26 becomes $l = 2 f_{OL} \cdot \tan(\Psi/2)$. Therefore, the relationship between the interval l between spots and the vertical angle Φ becomes as follows.

| Vertical angle Φ | Interval l between spots |
|---|---|
| 10° | 12.7 μm |
| 20° | 26.2 μm |

-continued

| Vertical angle Φ | Interval 1 between spots |
| --- | --- |
| 30° | 41.6 μm |
| 40° | 60.4 μm |
| 50° | 85.8 μm | wherein $f_{OL}=4$ mm.

As is shown in the above description, the interval between the spots on the optical disc 26 can be optionally varied simply by changing the structure (vertical angle Φ) of the Wollaston prism 28.

Each of the luminous fluxes divided into two bundles of rays and made incident upon the disc 26 is subjected to a rotation effect of the plane of polarization caused from Kerr effect in a recording pit 36 (see the magnetizing direction shown in FIG. 5) in a magnetic film of the disc 26. As a result, the luminous fluxes are reflected with the planes of polarization thereof rotated by an angle θk. The luminous fluxes are processed in a manner according to the conventional magneto-optical signal detection method or the servo signal detection method after the same have passed through the object lens 25 and divided and reflected by the beam splitter 24. Therefore, according to the structure of the light receiving elements 32 and 35 illustrated in FIGS. 7 and 8, each of the signals are detected from the following calculation.

Polarization component P of the spot

Tracking signal: D−C
Focusing signal: (I+J)−(L+K)
Magneto-optical signal: (I+L)−(J+K)

Polarization component S of the spot

Tracking signal: A−B
Focusing signal: (E+F)−(H+G)
Magneto-optical signal: (E+H)−(F+G)

Figure 18:
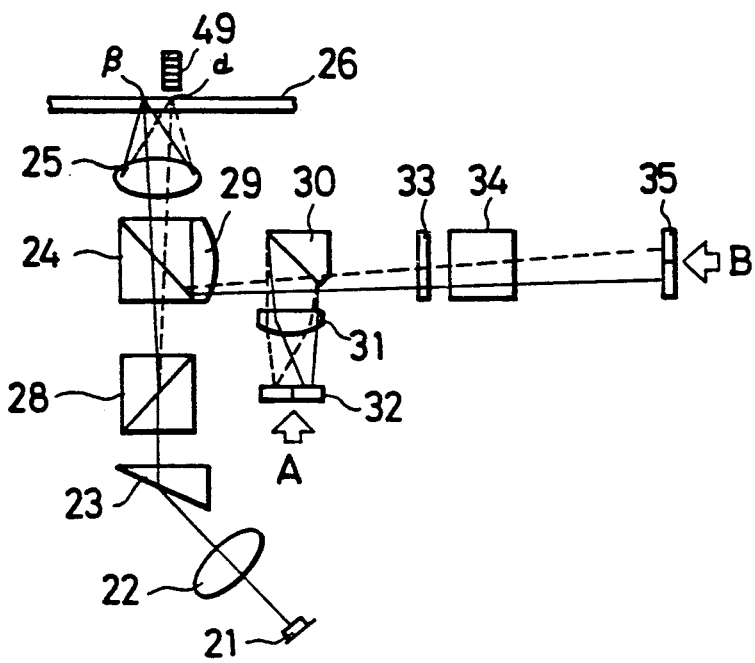
FIG. 18 is a view which illustrates an embodiment of the third device according to the present invention.
Figure 19:
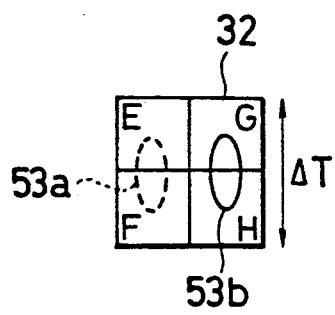
FIG. 19 is a plan view which illustrates the light receiving device viewed in the direction designated by an arrow A of FIG. 18.

State of polarization of the laser beam to be subjected to the detection operation after the laser beam has passed through each of the optical components is shown in FIG. 11. FIG. 11A is a view which illustrates a bundle of rays (incident angle of the plane of polarization: θ) with an intensity z after it has been emitted from the laser 21 and has passed through the lens 22 and the prism 23. After passing through the prism 28, this luminous flux is, as shown in FIG. 11B, divided into two luminous fluxes:polarizing component P ($z \cdot \cos^2 \theta$) and polarizing component S ($z \cdot \sin^2 \theta$). Then, as shown in FIG. 11C, the polarizing component P becomes $az \cdot \cos^2 \theta$, while polarizing component S becomes $bz \sin \cdot \sin^2 \theta$ after these two luminous fluxes have passed through the beam splitter 24 with the transmittance for the polarizing component P of a and the transmittance for the polarizing component S of b. Then, after the two luminous fluxes have been applied to the disc 26 and reflected under conditions that Kerr rotational angle θk and the reflectivity of γ, the polarizing component P becomes $\gamma az \cdot \cos^2 \theta$, and the polarizing component S becomes $\gamma bz \cdot \sin^2 \theta$ with a Kerr rotational angle of θk. That is, each of the polarizing component P and the polarizing component S is solely applied to the disc 26, and is reflected with the rotation caused from Kerr effect. As a result, the polarizing components P and S respectively include the corresponding polarizing components S and P. Furthermore, when the above-described two polarizing components P and S are reflected by the beam splitter 24 with the reflectivity for the polarizing component P of c and the reflectivity for the polarizing component S of d, the polarizing component P becomes, as shown in FIG. 11E, $\gamma az \cdot \cos^2 \theta$, and the polarizing component S becomes $\theta bz \sin^2 \theta$ since observed θk is increased and becomes θk'. When they pass through the λ/2-plate 33, the two polarizing components P and S become as shown in FIG. 11F with the plane of polarization thereof rotated. Then, when they pass through the prism 34, the two luminous fluxes are, as shown in FIG. 18, divided into four luminous fluxes each of which is solely formed by the either polarizing component P or the polarizing component S. That is, the following equations hold.

$$\gamma acz \cdot \cos^2 \theta \cdot \sin^2 \theta \, (45° + \theta k')$$

$$\gamma acz \cdot \cos^2 \theta \cdot \cos^2 \theta \, (45° + \theta k')$$

$$\gamma bdz \cdot \cos^2 \theta \cdot \sin^2 \theta \, (45° + \theta k')$$

$$\gamma bdz \cdot \cos^2 \theta \cdot \cos^2 \theta \, (45° + \theta k')$$

Then, recording/reproducing/erasing operations according to this embodiment will be described.

In an optical magneto-optical device of the type described above, erasing is in general performed by making the direction of magnetization equal by applying a laser beam with a predetermined power with an erasing magnetic field (for example, −4000 Oe) to the disc by a magnetic head. Then, the laser beam is ON/OFF controlled with a modulation signal which corresponds to the information signal with an inverse magnetic field (for example, +4000 Oe)applied by supplying an inverse current to the magnetic head. As a result, an inverse magnetic flux is supplied to only the position of the magneto-optical disc that is recorded with a high power (since the magnetization at this position can be readily reversed since it is applied with the laser beam) so that a recording pit is formed. When reproducing is performed, the magnitude of the power of the laser beam is reduced with respect to that at the time of performing recording.

According to this embodiment, thanks to the advantages obtained by the two-beam method, recording of information and validating of the same which are performed immediately after the recording has been completed can be performed during one rotation because an over-write type device in which recording and erasing can be simultaneously performed is realized and as well validating and reproducing (RAW) can be performed immediately after the recording and erasing have been completed. That is, disc needs to be rotated, to put it briefly, three times for a track in order to perform erasing/recording/reproducing (validating and reproducing) in a device of a single semiconductor laser light source type. However, according to this embodiment, they can be processed during one rotation of the disc. Furthermore, the intensity of the recording beam and that of the reproducing beam can be varied simply by changing the ratio of the light quantity by using the prism 28, and any modulation does not need to be applied to the laser. Therefore, a reproduction operation can be performed stably with a simple single laser 21.

In addition, in order to perform the modulation at a high speed, it is preferable for the size of the magnetic head 27 to be a reduced size, and to arrange the structure to be an air floating type.

Figure 12:
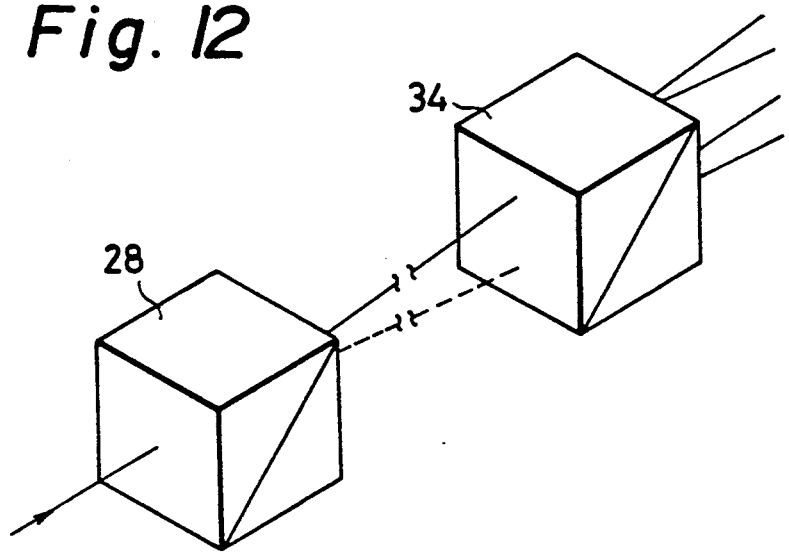
FIG. 12 is a perspective view which illustrates a modified example of the relationship between the directions in which the beams of the corresponding two Wollaston prisms are divided.

Although the directions of the luminous fluxes divided by the prisms 28 and 34 are arranged to be substantially perpendicular to each other according to this embodiment, they may be arranged to be substantially in parallel to each other as shown in FIG. 12 That is, referring to FIG. 12, the luminous flux is vertically divided into two luminous fluxes by the prism 28, and the thus-divided two luminous fluxes are applied to the disc 26. Then, they are reflected by the disc 26, and are made pass through the prism 34. As a result, each of these two luminous fluxes is divided into the same luminous fluxes, that is, they are vertically divided into two luminous fluxes arranged vertically. Therefore, four luminous fluxes are directed to the light receiving element 35. Therefore, the structure of the light receiving portion of the light receiving element 35 may be changed in this case.

Then, referring to the drawings, an embodiment of the second device according to the present invention will be specifically described.

Figure 13A:
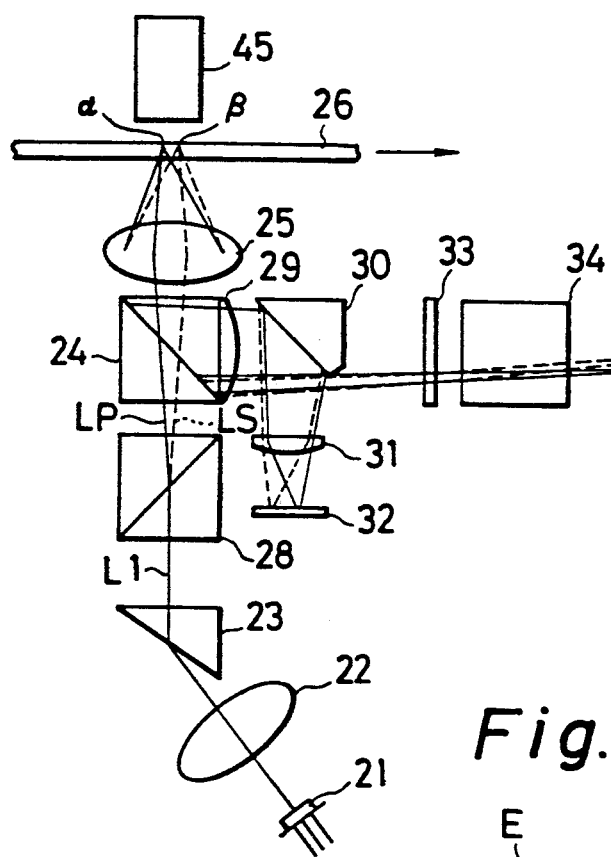
FIGS. 13A-13C are views which illustrate an embodiment of the second device according to the present invention.

Referring to FIG. 13A, a single luminous flux emitted from a semiconductor laser 21 including a single light emitting source is made a parallel luminous flux by the coupling lens 22. Then, this parallel luminous flux is subjected to a beam-shaping by the beam shaping prism 23, and is divided into two luminous fluxes in accordance with its polarizing components as a result of the passage of the same through the Wollaston prism 24. The thus-divided two luminous flux pass through the beam splitter 24, and are converged to form small spots $\alpha$ and $\beta$ on the recording plane on the magneto-optical disc 26 serving as an magneto-optical recording medium as a result of the effect of the object lens 25.

The reflected light from the disc 26 is made incident upon the beam splitter 24 via the lens 25 whereby it is reflected and is made a converged luminous flux as an effect of the lens 29. A portion of this converged luminous flux is reflected by the prism 30 having a knife edge, and is made incident upon the light receiving element 32 via the cylindrical lens 31. The residual luminous flux is made incident upon the Wollaston prism 34 via the ½-wave plate, and is made incident upon the light receiving element 35 after passing through the Wollaston prism 34. Reference numeral 45 shown in FIG. 13A represents a magnetic head.

The employed prisms 24 and 34 may be replaced by other type polarizers that contains double refraction crystal such as Rochon prisms.

In this embodiment, the employed prism 24 is provided as to serve as means for obtaining a plurality of bundles of rays from the laser 21 having a single light emitting source.

The optical effects of the prisms 24 and 34 will be described with reference to a prism 4 shown in FIG. 15.

Figure 15A:
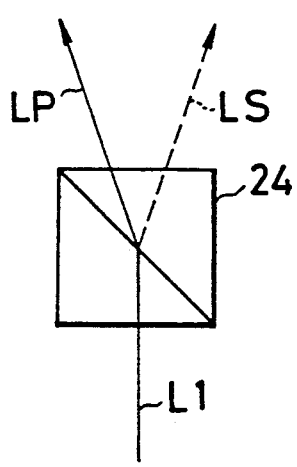
FIGS. 15A and 15B are views which illustrate division of bundles of rays performed by the device shown in FIG. 13.

As shown in FIG. 15A, assuming that the luminous flux to be made incident upon the prism 24 is Ll, the luminous flux which has passed through the prism 24 is divided into a luminous flux LP of the polarizing component P and a luminous flux LS of the polarizing component S.

Figure 15B:
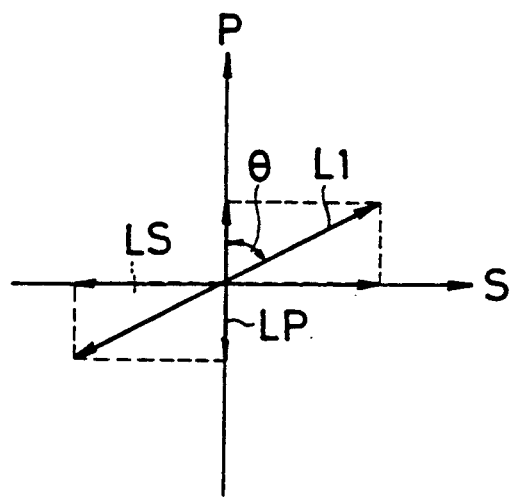

As shown in FIG. 15B, assuming that the incident angle of the plane of polarization of the incidental luminous flux L1 is $\theta$, the ratio P : S between the intensity of the transmitting light LP and the same of LS becomes as follows:

$$P : S = \cos^2 \theta : \sin^2 \theta$$

Therefore, the ratio between the intensity of the luminous flux LP and the same of LS can be optionally determined by changing the incidental angle $\theta$.

The description will return to FIG. 13A. In this embodiment, it is assumed that the intensity ratio between the luminous fluxes LP and LS is P:S = 3:1. This means a fact that $\cos^2 \theta = 3 \sin^2 \theta$. Therefore, $\tan^2 \theta = 1/3$, that is, $\tan \theta = 1/\sqrt{3}$, this means a fact $\theta = 30°$.

The incidental angle $\theta$ may be changed by integrally rotating the laser 21, lens 22, and the prism 23, or an wave plate may be inserted into a portion in front of the prism 24. It might be considered feasible to employ a variety of methods. However, since all of light which has been made incident upon the prism 24 can be utilized in the above-described methods, the light utilization efficiency can be improved. A method may be employed for the purpose of changing the intensity ratio between the luminous fluxes LP and LS, this method being arranged in such a manner that the transmittance of the polarized light of the beam splitter is varied. However, this method is inferior to the above-described method in terms of the light utilization efficiency.

Then, the interval between spots $\alpha$ and $\beta$ formed by the two luminous fluxes LP and LS to be converged on the recording surface of the disc 26 according to the embodiment shown in FIG. 13 will be described.

Figure 14:
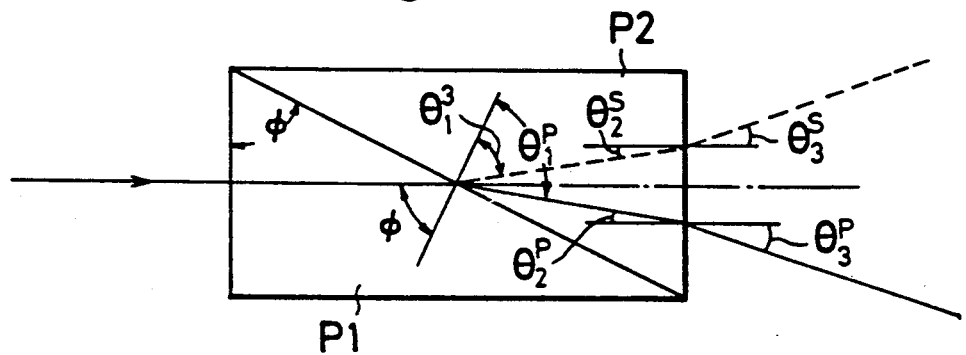
FIG. 14 is a view which illustrates an optical operation of the Wollaston prism.

FIG. 14 is a view which illustrates the optical effect of the Wollaston prism.

It is assumed that the prism angle of the two prisms forming the Wollaston prism is, as illustrated, arranged to be $\phi$.

In a prism P1, the polarizing component P becomes an abnormal ray, while the polarizing component S becomes a normal ray. The polarizing component S becomes, to the contrary, an abnormal ray, while the polarizing component P becomes a normal ray in prism P2.

Assuming that a refractive index for the normal ray is $n_o$, a refractive index for the abnormal ray is $n_E$, and angles $\theta_1^P$, $\theta_2^P$, $\theta_3^P \theta_1^S$, $\theta_2^S$, are $\theta_3^S$ arranged as illustrated, the following relationship holds for the polarizing component P:

$$n_E \cdot \sin \phi = n_o \cdot \sin \theta_1^P$$

$$n_o \cdot \sin \theta_2^P = \sin \theta_3^P$$

$$\phi = \theta_1^P - \theta_2^P$$

On the other hand, the following relationship holds for the polarizing component S:

$$n_o \cdot \sin \phi = n_E \cdot \sin \theta_1^S$$

$$n_o \cdot \sin \theta_2^S = \sin \theta_3^S$$

$$\phi = \theta_1^S - \theta_2^S$$

From these equations, $\theta_3^P$ and $\theta_3^S$ are determined by an angle $\phi$. Therefore, the division angle $\Phi = \theta_3^P + \theta_3^P + \theta_3^S$ is determined by the value of $\phi$. An example of the division angle $\Phi$ determined on the basis of the value of $\phi$ is shown in Table 1.

TABLE 1

| $\phi$ | 10 | 20 | 30 | 40 | 50 |
|---|---|---|---|---|---|
| $\Phi$ | 0.182 | 0.375 | 0.595 | 0.865 | 1.229 |

Assuming that the focal length of the lens 25 is of, the distance $d_o$ between spots when the two bundles of rays are converged on the recording surface of the disc can be given by $d_o = 2f_o \cdot \tan(\Phi/2)$ on the basis of the division angle $\Phi$. Therefore, the relationship between $\phi$ and the distance between the spots can be expressed as shown in Table 2, wherein f=4 mm.

TABLE 2

| $\phi$(degree) | 10 | 20 | 30 | 40 | 50 |
|---|---|---|---|---|---|
| d($\mu$m) | 12.7 | 26.2 | 41.6 | 60.4 | 85.8 |

Therefore, the spot interval do can be readily varied by simply changing $\phi$ by changing the structure of the prism 28.

In this state, the prism 28 may be replaced by a diffraction grating such as a hologram. Such an Wollaston prism and a diffraction grating can divide the incidental luminous flux into two luminous fluxes and as well three luminous fluxes if they are manufactured as such. If the luminous flux is divided into three luminous fluxes, the luminous flux can be used for erasing, recording and validating and reproducing.

Then, the information recording mode will be described with reference back to FIG. 13A.

The two luminous fluxes LP and LS divided by the prism 24 display the intensity ratio of 3:1, in which the luminous flux LP displays a relatively greater intensity. Therefore, the spot $\alpha$ formed by this luminous flux LP is used for recording, while the spot $\beta$ formed by the luminous flux LS is used for validating and reproducing.

In this state, the magnitude of the energy of the spot is arranged to be 3 mw and the same of the spot $\beta$ is 1 mw in this embodiment.

With the disc 26 rotated, the laser 21 is continuously turned on with a predetermined power, and the magnetic head 15 is modulated by an information signal. As a result of thus-performed modulation, the direction of magnetization of the recording surface at the position at which the spot $\alpha$ is applied is changed in accordance with an information signal so that this information signal is recorded as a magnetic signal on the magneto-optical disc 26. In addition, information recorded previously is erased simultaneously with recording of this information. That is, recording and erasing of information can be simultaneously performed by the spot $\alpha$ formed by the luminous flux LP.

On the other hand, information recorded by means of the spot $\alpha$ is immediately applied by means of the spot $\beta$ so that validating and reproducing can be performed.

Then, validating and reproducing and focusing and tracking of the spots $\alpha$ and $\beta$ will be described.

The reflected light from the disc 26 is, as described above, made a converged luminous flux after it has passed through the lens 29 via the lens 25 and the beam splitter 24. A portion of this converged luminous flux is reflected by the prism 30, and is made incident upon the light receiving element 11 via the lens 31.

Figure 13B:
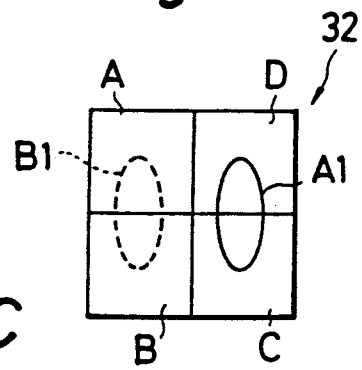

The light receiving element 32 includes, as shown in FIG. 13B, four light receiving portions A, B, C and D so that outputs a, b, c, and d are obtained from the above-described light receiving portions A, B, C, and D in accordance with the amount of received light. The lens 31 is arranged in such a manner that the generating line thereof is arranged to be perpendicular to the drawing sheet of FIG. 13A. Therefore, each reflected light from the spots $\alpha$ and $\beta$ is made incident as a result of the effect of the lens applied laterally thereto, when viewed in FIG. 13B. Thus, reflected light from the spot $\alpha$ is made incident upon an oval portion A1 including the light receiving portions C and D, while the same from the spot $\beta$ is made incident upon an oval portion B1 including the light receiving portions A and B. The vertical direction shown in FIG. 13B corresponds to the direction which is perpendicular to the drawing sheet for FIG. 13A. If there is any shift of the track at the spots $\alpha$ and $\beta$, the spots A1 and B1 shift in the direction of the longer axis thereof (the direction which is perpendicular to the drawing sheet for FIG. 13A, that is, the direction corresponding to the direction perpendicular to the track). Therefore, a tracking control can be realized by performing a tracking servo in which (d−c) is made an error signal for the spot $\alpha$, and (a−b) is made an error signal for the sport $\beta$.

The plane of polarization of reflected light which has not been reflected by the prism 30 of the reflected light which had been made a converged light by the lens 29 is, as described above, turned by 45° by the ½-wave plate 33. Then, this reflected light is made incident upon the prism 34, and is again divided into the polarizing components S and P.

Figure 16:
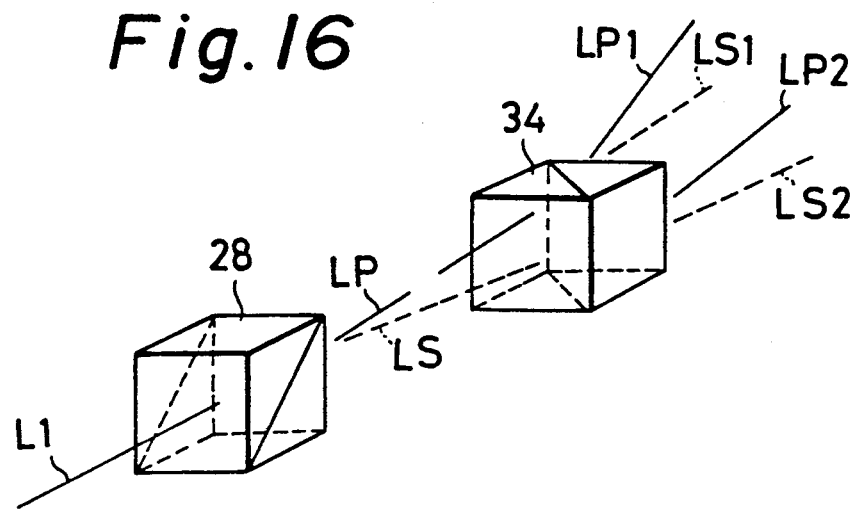
FIG. 16 is a schematic and perspective view which illustrates the relationship between the directions in which the beams of the corresponding two Wollaston prisms of the device shown in FIG. 13 are divided.

The prism 34 is, as shown in FIG. 16, arranged as to make the directions of the divided luminous fluxes perpendicular to each other. As a result, as shown in FIG. 16, four luminous fluxes LP1, LP2, LS1, and LS2 can be obtained. The luminous fluxes LP1 and LP2 are the reflected light of the spot $\alpha$, while the luminous fluxes LS1 and LS2 are the reflected light of the spot $\beta$.

Figure 13C:
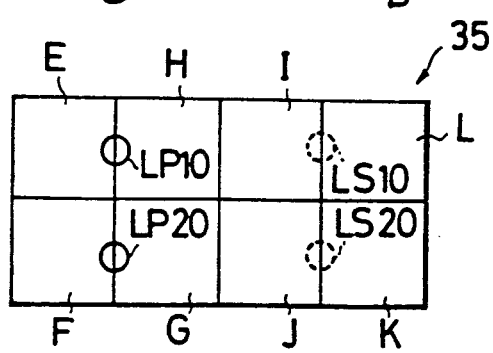

These luminous fluxes are made incident upon the light receiving element 14. The light receiving element 14 includes, as shown in FIG. 13C, eight light receiving portions E, F, G, H, I, J, K, and L and outputs e, f, g, h, i, j, k, and 1 are transmitted from the above-described light receiving portions. The bundle of rays LPI is, as shown in FIG. 13C, made incident as to form a spot LP10 which includes the light receiving portions E and H. The bundles of rays LP2, LS1, and LS2 are made incident as to form the corresponding spots LP20, LS10, and LS20 as shown in FIG. 13C. The spots LP10 and LSIO correspond to the polarizing component P, while the spots LP20 and LS20 correspond to the polarizing component S.

A signal (i+j)−(1+K) forms a focusing error signal for the spot $\beta$, this focusing error signal being able to be obtained by a known knife edge method. Similarly, a signal (e+f)−(g+h) forms a focus error signal for the spot $\alpha$. Therefore, the spots $\alpha$ and $\beta$ can be subjected to focusing control by performing the known focus servo on the basis of these focus error signals.

Although the spots $\alpha$ and $\beta$ are formed by the polarizing components P and S when respectively applied to the magneto-optical disc, their planes of polarization are turned due to the Kerr effect when reflected on the disc 26.

Therefore, signals (i+1)−(j+k) and (e+h)−(f+g) obtained from the outputs from the light receiving portions of the light receiving element 14 can comprise the magneto-optical signals for the spots $\alpha$ and $\beta$. Therefore, information recorded after passing through the spot $\alpha$ can be validated and reproduced by reproducing information with the optical magnetic signal for the spot $\beta$.

Then, the way in which the plane of polarization and the intensity of the luminous fluxes are changed after the luminous flux has been emitted from the semiconductor laser 21 will be briefly described with reference to FIG. 17.

Figure 17A:
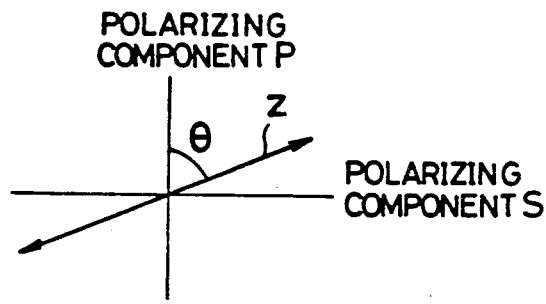
FIGS. 17A-17C are views which illustrate light deflection after the beam has passed through the device shown in FIG. 13.

FIG. 17A is a view which illustrates state before the luminous flux Ll is made incident upon the prism 24. The incidental angle $\theta$ of the plane of polarization is, as described above, 30 in this embodiment. It is assumed that the intensity of this luminous flux is Z.

Figure 17B:
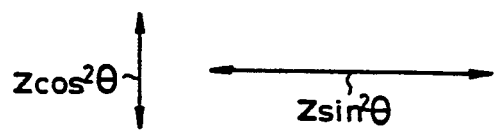

When the bundle of rays passes through the prism 28, it is divided into two luminous fluxes. As shown in FIG. 17B, the intensity of the bundle of rays LP is, as illustrated, $Z \cdot \cos^2\theta$, while the intensity of the luminous flux LS is $Z \cdot \sin^2\theta$.

Figure 17C:
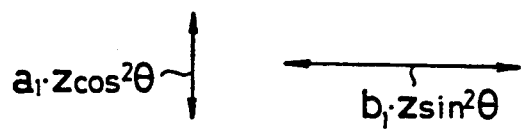
Figure 17D:
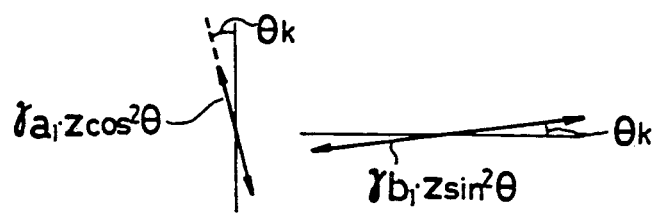

When the luminous fluxes pass through the beam splitter 24, the intensity of the luminous fluxes LP and LS becomes as shown in FIG. 17C assuming that the transmittance of the intensity of the polarizing component P is $a_1$ and the same of the polarizing component S is $b_1$. Then, the luminous fluxes LP and LS which have been made incident upon the magneto-optical disc 26 are reflected, and the planes of polarization thereof are turned due to the Kerr effect at the time of this reflection of the same. It is assumed that the rotational angle at this time is $\theta k$ and the reflectivity of the magneto-optical disc 26 is $\gamma$. Then, the intensity of the reflected light from the spots $\alpha$ and $\beta$ becomes, as shown in FIG. 17D, $\gamma a_1 Z \cos^2\theta$, and $\gamma b_1 Z \sin\theta^2$, respectively.

Figure 17E:
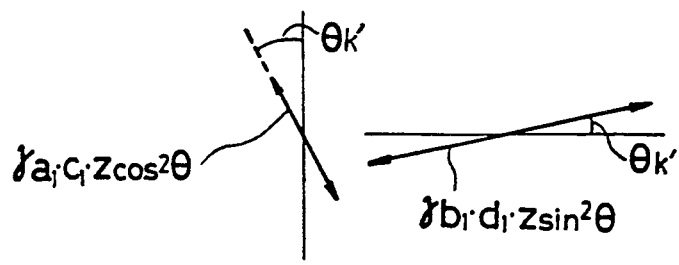

After the luminous fluxes have been reflected by the beam splitter 28, the intensity of the reflected light from the spots $\alpha$ and $\beta$ becomes as shown in FIG. 17E assuming that the transmittance of the intensity of the polarizing component P is $c_1$ and the same of the polarizing component S is $d_1$. At this time, since $c_1$ differs from $d_1$, the plane of the polarization of each of reflected light is additionally changed to $\theta'k$.

Figure 17F:
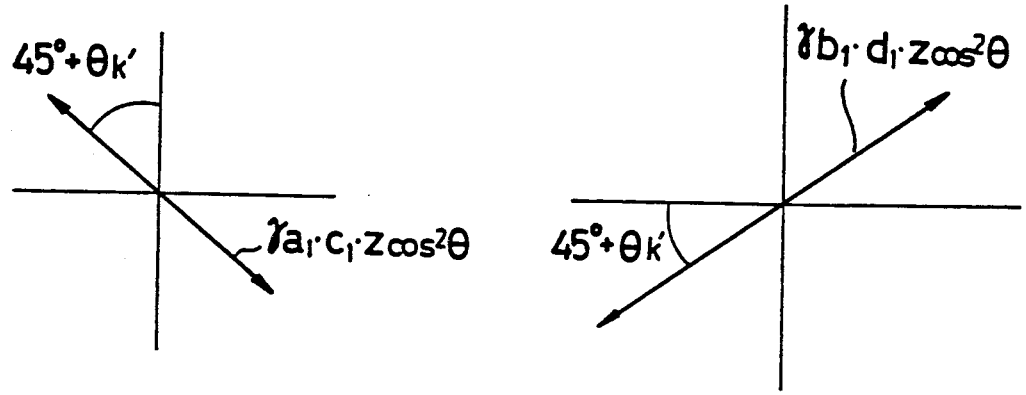

Then, after the reflected light has passed through the ½-wave plate 33, each of the planes of polarization of the reflected light from the spots $\alpha$ and $\beta$ is turned by 45° with its corresponding intensity maintained at $\gamma a_1 Z \cos^2\theta$ and $\gamma b_1 Z \sin\theta^2$. Therefore, the incidental angles of the plane of polarization with respect to the prism 34 become, as shown in FIG. 17F, $\theta'k + 45°$.

Figure 17G:
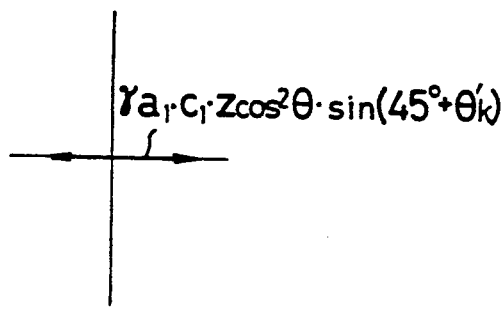
Figure 17H:
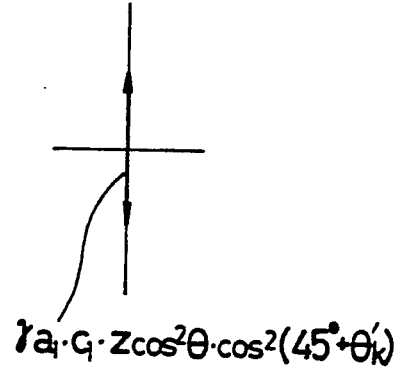
Figure 17I:
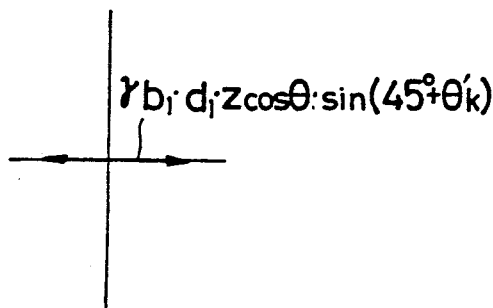
Figure 17J:
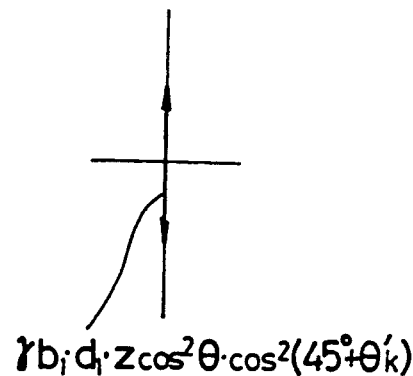

After the reflected light has passed through the prism 34, the reflected light from the spot $\alpha$ is divided into a polarizing component S shown in FIG. 17G and a polarizing component P shown in FIG. 17H. On the other hand, the reflected light from the spot $\beta$ is divided into a polarizing component S shown in FIG. 17I and a polarizing component P shown in FIG. 17J.

The thus obtained four luminous fluxes form the spots LP10, LP20, LS10, and LS20, respectively as previously shown in FIG. 13C.

A reproducing mode will finally be described.

If a reproduction with the spot $\beta$ is performed with the same output from the semiconductor laser in the above-described recording mode (over-write mode), the spot which becomes unnecessary in this case is turned on with 3 mw. Therefore, the coercive force of the magneto-optical disc can deteriorate.

Accordingly, reproduction is performed by using the spot $\alpha$ which has been used for recording performed in the recording mode. However, since the energy level of 3 mw is too large to be used for reproduction, the output from the semiconductor laser 1 is reduced as to make the energy at the spot $\alpha$ 1 mw. As a result of this, the energy level of the spot $\beta$ necessarily becomes 0.3 mw so that the spot $\beta$ which is not used for the reproduction does not affect the coercive force of the magneto-optical disc.

An embodiment of the third device according to the present invention will be described with reference to FIGS. 18 to 23. A single-chip semiconductor laser 21 is provided to serve as a light source. A laser beam emitted from this laser 21 is made a parallel bundle of rays by the coupling lens 22, is beam-shaped by the beam-shaping prism 23, and is made incident upon the Wollaston prism 28. At this time, since the plane of polarization of the laser beam emitted from the laser 21 inclined by an angle $\theta$ in the plane perpendicular has been inclined by an angle $\theta$ in the plane perpendicular to the drawing sheet for FIG. 18, two polarizing components P and S are made incident upon the prism 28. Therefore, the beam is divided into two beams: a beam formed by only the polarizing component P and a beam formed by only the polarizing component S as a result of passing of the same through the prism 28. The intensity ratio between the thus-divided two beams can be optionally varied by changing an angle $\theta$ of the plane of polarization of the laser beam made incident upon the prism 28.

The two beams obtained by being divided by the prism 28 are successively converged on the same track of the disc 26 to form small two spots $\alpha$ and $\beta$ by the same object lens 25 after they have passed through the same beam splitter 34. The preceding spot $\alpha$ is adapted to be used for recording (for over writing) with a magnetic field applied by a magnetic head 49 of an air floating type to be modulated in response to information to be recorded at the time of performing recording so that recording is performed. The ensuing spot $\beta$ is adapted to be used for reproducing or validating and reproducing.

The beams from the spots $\alpha$ and $\beta$ reflected by the disc 26 pass through the lens 25 again, and are reflected by the beam splitter 24. As a result, the beams are separated from the incidental light, and are directed to the detection optical system. The thus-separated beam is propagated with converged by the detection lens 29, and is divided into reflected light and rectilinear propagation light by the knife edge prism 30. The two reflected beams from the prism 30 are, by the cylindrical lens 31, made incident upon the light receiving element 32 which acts to detect track signals so that oblong spots 53a and 53b are formed on the light receiving element 32. Since the light receiving element 32 is arranged to be of a four-piece type element as designated by an arrow A shown in FIG. 19 and the generating line of the lens 31 is arranged to be perpendicular to the track, a tracking error signal $\Delta T$ can be detected by the push-pull method in which the vertical (when viewed in FIG. 19) difference of the oblong spot 53a or 53b is obtained.

Figure 20:
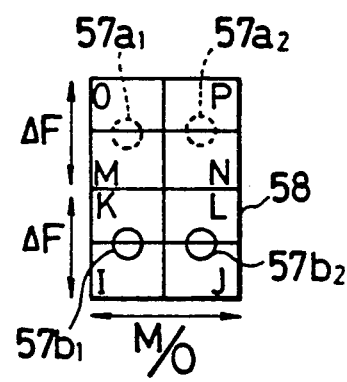
FIG. 20 is a plan view which illustrates the light receiving device viewed in the direction designated by an arrow B of FIG. 18.

On the other hand, each of the planes of polarization of the two beams to be rectilinearly propagated through the prism 30 is turned by 45° by the $\lambda/2$-plate 33, and is divided into the polarizing components P and S by the prism 34 which is arranged to be perpendicular to the directions of the beams divided by the prism 28. As a result, they are made incident upon the light receiving element 35 which is adapted to detect focus error signals and to detect as well magnetic signals so that four spots $57a_1$, $57a_2$, $57b_1$, and $57b_2$ are formed on the light receiving element 35. As shown In FIG. 20 which is view B of FIG. 18, this light receiving element 35 is divided into eight regions. A focusing error signal $\Delta F$ or a magneto-optical signal M/0 is detected in response to the detection signal obtained by this light receiving element 35.

Assuming that signals corresponding to four regions of the light receiving element 32 are E to H and signals corresponding to eight regions of the light receiving element 35 are I to P, information upon the recording/erasing spot $\alpha$ can be detected as follows:

$$\Delta T = E - F$$

$$\Delta F = (M+N) - (O+P) \text{ or}$$

$$\Delta F = M - O \text{ or}$$

$$\Delta F = N - P$$

$$M/O = (M+O) - (N+P)$$

On the other hand, information upon the reproducing (validating and reproducing) spot 18b can be detected as follows:

$$\Delta T = G - H$$

$$\Delta F = (I+J) - (K+L) \text{ or}$$

$$\Delta F = I - K \text{ or}$$

$$\Delta F = J - L$$

$$M/O = (I+K) - (J+L)$$

Since the two spots $\alpha$ and $\beta$ on the disc 26 are formed by dividing a beam emitted from the laser 21, the positions of convergence of the two spots on the disc 26 coincide with each other in the direction of the optical axis. That is, the signals related to the focusing error are the same for the two beams. Therefore, a focusing error signal $\Delta F$ can be detected by any of the manners as:

$$\Delta F = (M+N) - (O+P)$$

$$\Delta F = M - O$$

$$\Delta F = N - P$$

$$\Delta F = (I+J) - (K+L)$$

$$\Delta F = I - K$$

$$\Delta F = J - L$$

The most preferable detection signal for detecting a focusing error signal $\Delta F$ will be described.

Figure 21A:
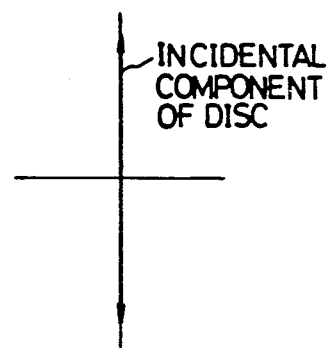
FIGS. 21A and 21B are views which illustrate the vectors of the light deflection components of incident-light/reflected-light.
Figure 21B:
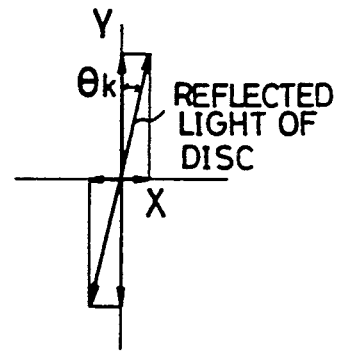

The incidental component as shown in FIG. 21A made incident upon the disc 26 is reflected by this disc 26 at a Kerr rotational angle $\theta k$ as shown in FIG. 21B caused from a Kerr effect with the intensity ratio 3:1 between the recording/erasing spot $\alpha$ and the reproducing spot $\beta$. In this case, the intensity ratio between the four spots $51a1$, $51a2$, $51b_1$, and $51b_2$ on the light receiving element 35 becomes as:

$$(I+K):(J+L):(M+0):(N+P) = 1:1:3:3$$

Figure 22:
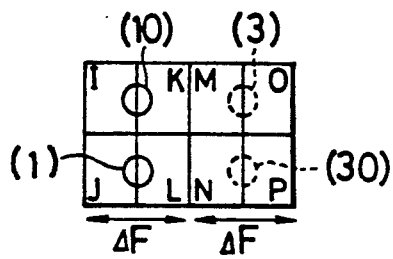
FIG. 22 is a view which illustrates the intensity ratio in the light receiving devices of FIG. 20.

FIG. 22 is a view which illustrates the intensity ratio, wherein illustrated numerals (1),(1),(3), and (3) mean the factors of the intensity ratio. The vertical interval between the spots shown in FIG. 22 relating to the positional relationship between the four spots $51a1$, $51a2$, $51b_1$, and $51b_2$ can be optionally varied by arranging the structure of the prism 34 (since the division angle of the two beams can be determined by the vertical angle of this prism 34 after the two beams have passed through this prism 34, for example, this vertical angle of this prism needs to be arranged to obtain a desired spot interval). On the other hand, the lateral interval between the spots can be determined by the structure of the prism 24 and the lens 29. However this lateral interval (the vertical interval between spots when viewed in FIG. 18) involves a certain limitation on the basis of the interval between spots on the disc 26 and the size of the optical pickup. Therefore, an error involved in detecting the focusing error signal can be reduced as possible by employing a focusing error signal $\Delta F$ with a relatively greater intensity on the light receiving element.

According to this embodiment, it is preferable to detect it on the basis of either $51a1$ or $52a2$, or both of them as:

$$\Delta F = M - O$$

$$\Delta F = N - P$$

These spots $51a1$ and $52a2$ are formed by the reflected beam with a relatively greater intensity for recording of the two beams to be applied to the disc 26.

Figure 23:
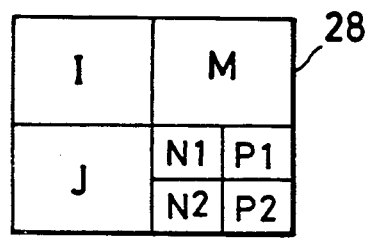
FIG. 23 is a side view which illustrates a modified example of the light receiving device of FIG. 20.
Figure 24:
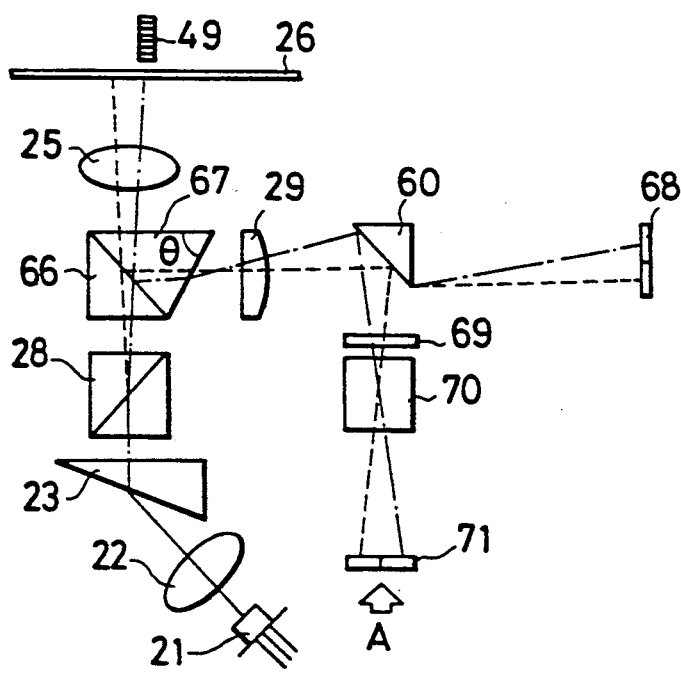
FIG. 24 is a view which illustrates an embodiment of the fourth device according to the present invention.

As an alternative to the manner of dividing the light receipt detection region of the light receiving element 35 into eight regions as shown in FIG. 20, an arrangement may be employed as shown in FIG. 23 such that the portions I and K are integrated to form a portion I, the portions J and L are integrated to form a portion J, the portions M and 0 are integrated to form a portion M, the portion N is divided into two portions N1 and N2, and the portion P is divided into two portions P1 and P2.

In this case, detection may be performed as follows:

$$\Delta F = (P1 + P2) - (N1 + N2)$$

$$M/O = M - (N1 + N2 + P1 + P2)$$

A reproduction signal (verify signal) immediately after recording has been completed $= I - J$.

Although a knife edge method is employed in this embodiment to detect focusing error signals, an astigmatism method or a concentric method may be employed.

In a case of a sample servo in which the tracking error signal is unnecessary, the light receiving element 32 for detecting tracking error signals may, of course, be omitted.

However, the conventional optical pickup devices suffer from the following problem. If the interval between spots on the disc 26 is reduced, the interval between spots on the light receiving element 35 also becomes reduced, causing difficulty in assembly since the interval between two spots on the disc 26 and the interval in the direction of the track between the spots on the light receiving element 35 are in a conjugate relationship. In addition, if the interval between the spots on the light receiving element 35 is too narrow, the spots on the element can overlap at the time of defocus, causing a correct signal detection to become impossible to be performed.

For example, assuming that the division angle between the two luminous fluxes realized by the prism 24 is $\psi$, a focal length of the lens 25 is $f_{OL}$, a focal length of the lens 29 is $f_{DL}$, an interval between spots on the disc 26 is l, and an interval between spots on the light receiving element 35 is L, the intervals l and L between spots can be expressed as follows:

$$l = 2 \cdot f_{OL} \tan(\psi/2)$$

$$L = 2 \cdot f_{DL} \tan(\psi/2)$$

Assuming specifically in this state that $l = 15$ μm and $f_{OL} = 4$ mm, the division angle $\psi \approx 12.9'$. Assuming that $f_{DL} = 55$ mm, the interval L between spots on the light receiving element 35 in this state becomes $L = 206$ μm. As a result, the interval between the spots are too small to readily assembling the device. Furthermore, each of the spots on the light receiving element 35 can be enlarged, causing a possibility for the spots to be mixed as noise with the detection regions.

An embodiment of the fourth device according to the present invention will be described with reference to FIGS. 24 to 28. The same components as those shown in FIG. 18 are given the same reference numerals. According to this embodiment, the beam splitter 24 shown in FIG. 18 is replaced by a beam splitter 66 revealing the beam splitter function and a predetermined prism function. That is, this beam splitter 66 acts similarly to the beam splitter 24 on the light passage between the Wollaston prism 28 and the object lens 25. However, a prism 67 with a vertical angle θ and having a light emitting surface 67a serving as a portion for enlarging the division angle for the purpose of preventing the reflected beam from being made vertical is included in the light passage directed to the light receipt detection system. As a result of this, the division angle 2ψ defined by the two reflected beams to be emitted from the prism 67 to the light receipt detection system can be enlarged.

Figure 25:
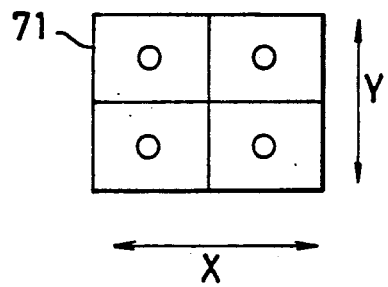
FIG. 25 is a plan view which illustrates a light receiving device of the device shown in FIG. 24.

The two beams are made a converged beam by the lens 29 after the division angle therebetween has been enlarged. A portion of the converged beam is reflected by the knife edge prism 60, and another portion thereof is rectilinearly propagated. The rectilinearly propagated two beams are received by a light receiving element 68 for detecting focus signals so that it is used for detecting the focus signal by the knife edge method. On the other hand, the planes of polarization of the two beams reflected by the prism 60 are turned by a λ/2-plate 69 by substantially 45°1. Then, each of these two beams are further divided into the polarizing components P and S by an Wollaston prism 70 arranged to be perpendicular to the direction of division of the luminous fluxes realized by the Wollaston prism 28. As a result, they are made incident upon a light receiving element 71 for detecting magneto-optical signal which is divided into four regions as shown in FIG. 25 (which is the view A of FIG. 24) to form four spots. That is, assuming that the directions of divisions of the luminous fluxes realized by the prisms 28 and 70 are arranged to be perpendicular to each other, the positional relationship of the four spots when the light receiving element 71 which is divided into four regions is viewed in the direction A becomes as shown in FIG. 25. The tracking detection signal is also detected by this light receiving element 71.

At this time, the interval between spots in the direction Y can be optionally varied by arranging the structure of the prism 70 (since the division angle of the two beams can be determined by the vertical angle of this prism after the two beams have passed through this prism, for example, this vertical angle of this prism needs to be arranged to obtain a desired spot interval).

Since the interval L between spots in direction X is in the conjugate relationship with the interval l between two spots on the disc 26, L is limited on the basis of the value l as described above. This relationship can be expressed as follows.

$$L = (f_{DL}/f_{OL}) \cdot l$$

However, according to this embodiment, an interval L between spots on the light receiving element 71 can be determined regardless of an interval l between spots on the selecting a proper vertical angle θ of the prism disc 26 by selecting a proper vertical angle θ of the prism 67 of the beam splitter 66. That is, by expanding this interval L between spots to a desired length, both the facility in mounting the light receiving element 71 and accuracy in detecting a signal can be improved.

Figure 26:
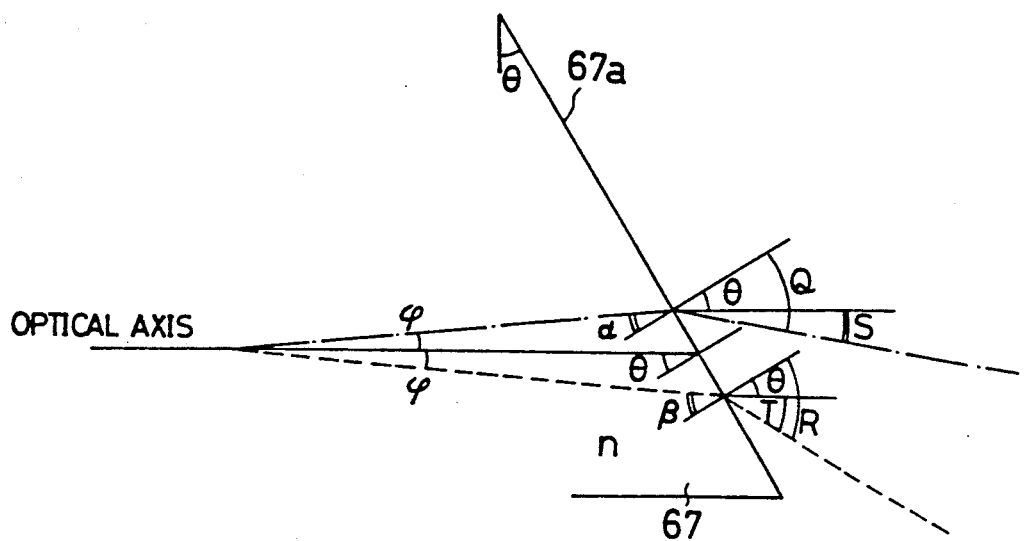
FIG. 26 is a view which illustrates the division-angle enlarging operation performed by the prism 67 of FIG. 24.

The principle of enlargement of the division angle between the two bundles of rays realized by the prism 67 according to this embodiment will be described with reference to FIG. 26. It is assumed that two beams which propagates at a division angle of 2ψ (that is, an angle of ψ with respect to the optical axis) through the prism 67 are emitted from the emission plane 67a to air. The following relationships can hold provided that a vertical angle of the prism 67 is θ, a refractive index of the prism 67 is n, a refractive index in air is 1, incidental angles of the two beams with respect to the emission plane 67a are α and β respectively, emitting angles are Q and R respectively, and inclinations of the injected beams with respect to the optical axis are S and T, respectively.

$$\alpha = \theta - \psi$$

$$\beta = \theta + \psi$$

$$n \cdot \sin \alpha = \sin Q$$

$$n \cdot \sin \beta = \sin R$$

$$S = Q - \theta$$

$$T = R - \theta$$

From the above-described relationships, the angle (T − S) defined by the two beams emitted from the prism 67 can be expressed as follows:

$$\begin{aligned} T - S &= (R - q) - (Q - q) \\ &= R - Q \\ &= \sin^{-1}(n \cdot \sin\beta) - \sin^{-1}(n \cdot \sin\alpha) \\ &= \sin^{-1}\{n \cdot \sin(\theta + \psi)\} - \sin^{-1}\{(n \cdot \sin(\theta - \psi)\} \end{aligned}$$

The variation of the division angle of the prism 67 with respect to a vertical angle θ is shown in Table 3, wherein a refractive index n of the prism 67 is n = 1.5, a division angle between two beams in the prism 67 is $2\psi = 10'$.

TABLE 3

| Vertical angle θ[°] | Division angle 2Ψ['] in prism | Division angle T-S ['] after emission |
|---|---|---|
| 5° | 10' | 15.1' |
| 10° | 10' | 15.3' |
| 15° | 10' | 15.7' |
| 20° | 10' | 16.4' |

TABLE 3-continued

| Vertical angle θ[°] | Division angle 2Ψ['] in prism | Division angle T-S ['] after emission |
|---|---|---|
| 25° | 10' | 17.6' |
| 30° | 10' | 19.6' |
| 35° | 10' | 24.1' |

As is shown from this table 3, the division angle of the two beams to be emitted can be enlarged by selecting a proper vertical angle θ of the prism 67 so that an interval L between spots on the light receiving element 71 can be widened.

It is preferable for a vertical angle θ of this prism 67 to be determined as to have at least one of the two beams made incident upon this prism 67 at the critical angle or less.

A result of a comparison made between the method according to this embodiment and the conventional method shown in FIG. 18 is shown in Table 4, wherein $f_{OL}=4$ mm, $f_{DL}=55$ mm, and $\theta=35°$.

TABLE 4

|  | Embodiment | Conventional method |
|---|---|---|
| Division angle by Wollaston prism 28 | 12.9' | 12.9' |
| Interval l between spots | 15 μm | 15 μm |
| Division angle after emitted from beam splitter 29 |  | 12.9' |
| Division angle after emitted from prism 67 | 20.7' |  |
| Interval L between spots | 331 μm | 206 μm |

As is shown from Table 4, and according to this embodiment, even if the intervals l between spots on the disc 26 are equal to each other, the interval L between spots on the light receiving element 71 can be widened by using a prism 67. As a result, a facility in mounting the light receiving element 71 and an accuracy in detection can be improved.

Although in this embodiment, the prism 67 is integrally formed with the beam splitter 66 to serve a portion of this beam splitter 66, it may be individually provided at an optional position between the object lens 23 and the light receiving element 68 or 71.

Figure 27:
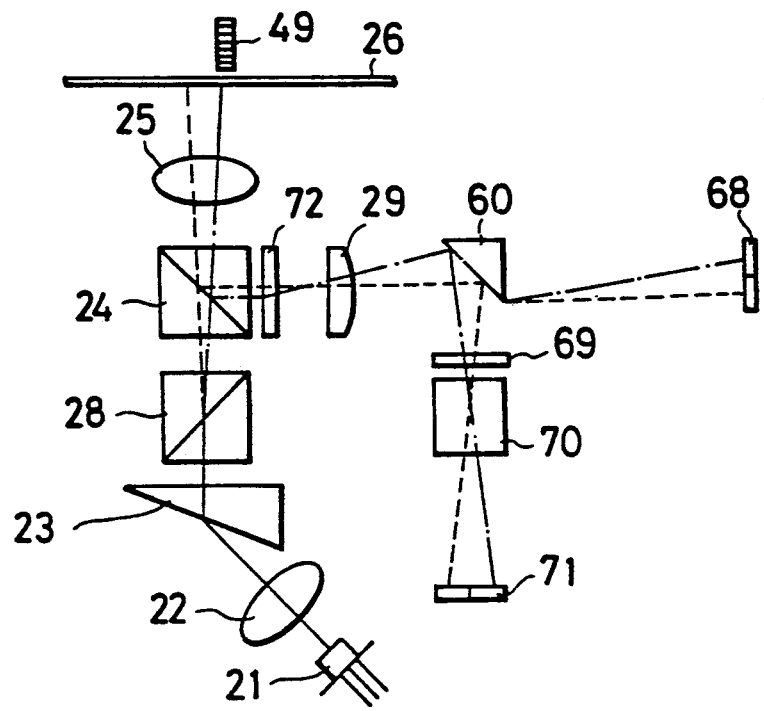
FIG. 27 is a view which illustrates a modified example of the fourth device according to the present invention.

FIG. 27 is a view which illustrates a modified example of the fourth device according to the present invention in which the beam splitter 25 is provided in the conventional manner a grating plate 72 is, as an optical component, provided on the side from which the reflected beam emits. As a result of the thus-provided grating plate 72, the division angle between the two reflected beams are enlarged. In this case, this grating plate 72 serves as the portion for enlarging the division angle.

Figure 28:
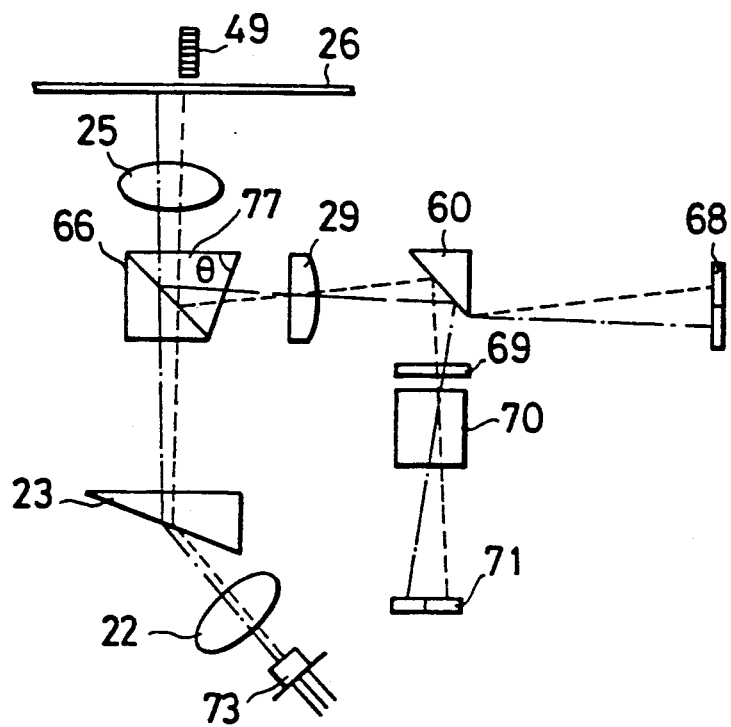
FIG. 28 is a view which illustrates another modified example of the fourth device according to the present invention.

Then, another embodiment of the fourth device according to the present invention will be described with reference to FIG. 28. This embodiment is characterized in that the present invention is embodied in a structure arranged in such a manner that a semiconductor laser LD 73 (an LD array or a double wave length hybrid LD) is employed (a structure in which a plurality of LDs each having a single light source may be employed) as an alternative to the semiconductor laser 21 for emitting single laser beam as to emit a plurality of beams with a predetermined angle formed therebetween from the light sources. Therefore, the Wollaston prism 28 for dividing beams which is employed in the above-described embodiment becomes needless to be provided.

Many widely different embodiments of the present invention may be constructed without departing from the spirit and scope of the present invention. It should be understood that the present invention is not limited to the specific embodiments described in this specification, except as defined in the appended claims.

What is claimed is:

1. A magneto-optical pick-up device, comprising:
   a sole semiconductor laser beam source for emitting a sole luminuous flux;
   a beam dividing element for receiving said luminous flux emitted from said laser beam source and for dividing said received luminous flux into first and second emitted luminous fluxes;
   a polarization-plane tilting means for tilting a plane of polarization of said first and second emitted luminous fluxes with respect to an optical axis of said beam dividing element to thereby cause said first and second emitted luminous fluxes to have light intensities which are different from each other;
   a sole object lens for receiving said first and second emitted luminous fluxes and for converging said first and second emitted luminous fluxes into two respective small spots positioned at the same track of a magneto-optical recording medium, said first and second emitted luminous fluxes being reflected from said medium as respective first and second reflected luminous fluxes;
   a beam splitting means disposed on an optical path between said beam dividing element and said object lens for separating the first and second emitted luminous fluxes which are incident on said beam splitting means from said first and second reflected luminous fluxes; and
   a power varying means for varying a power parameter of said laser beam source in such a manner that:
   (i) in a recording mode, said laser beam source operates at a recording power output and said first emitted luminous flux is used to record information on the medium while said second emitted luminous flux has lower intensity than the first emitted luminous flux and is used to validate information recorded on the medium; and (ii) in a reproducing mode, said laser beam source operates at a reproducing power output which is lower than said recording power output and said first emitted luminous flux has an intensity lower than the that of the first emitted luminous flux in the recording mode and is used to reproduce recorded information from the medium while the second emitted luminous flux in the reproducing mode to thereby protect a coercive force of said magneto-optical recording medium from an effect of said second emitted luminous flux in the reproducing mode.

2. A magneto-optical pickup device according to claim 1, in which said beam dividing element comprises a Wollaston prism.

3. A magneto-optical pickup device according to claim 1, in which said beam dividing element comprises a Rochon prism.

4. A magneto-optical pickup device according to claim 2, in which said polarization-plane tilting means is a wave plate.

5. A magneto-optical pickup device according to claim 3, in which said polarization-plane tilting means is a wave plate.

6. A magneto-optical pickup device according to claim 4, in which said beam splitting means comprises a first section disposed on said optical path between said beam dividing element and said object lens for passing through said first and second luminous fluxes emitted from said beam dividing element and for reflecting said first and second luminous fluxes reflected from said magneto-optical recording medium toward a light detecting system, and a second section disposed on another optical path of said first and second luminous fluxes reflected from said first section and comprising a prism having a predetermined vertical angle for enlarging a division angle between two luminous fluxes to be emitted from said second section toward said light detecting system.

7. A magneto-optical pickup device according to claim 5, in which said beam splitting means comprises a first section disposed on said optical path between said beam dividing element and said object lens for passing through said two luminous fluxes emitted from said beam dividing element and for reflecting said two luminous fluxes reflected from said magneto-optical recording medium toward a light detecting system, and a second section disposed on another optical path of said two luminous fluxes reflected from said first section and comprising a prism having a predetermined vertical angle for enlarging a division angle between two luminous fluxes to be emitted from said second section toward said light detecting system.

* * * * *

UNITED STATES PATENT AND TRADEMARK OFFICE
CERTIFICATE OF CORRECTION

PATENT NO. : 5,073,888

DATED : December 17, 1991

INVENTOR(S) : Yoshitaka Takahashi et al.

It is certified that error appears in the above-identified patent and that said Letters Patent is hereby corrected as shown below:

Column 26, line 49, (Claim 1), after "lower than" delete "the";

Column 26, line 53, after "flux", insert --has an intensity lower than that of the first emitted luminous flux--.

Signed and Sealed this

Twenty-fourth Day of August, 1993

*Attest:*

BRUCE LEHMAN

*Attesting Officer*    *Commissioner of Patents and Trademarks*